(12) United States Patent
Hsu et al.

(10) Patent No.: US 9,429,735 B2
(45) Date of Patent: Aug. 30, 2016

(54) OPTICAL LENS SYSTEM, IMAGE CAPTURING UNIT AND ELECTRONIC DEVICE

(71) Applicant: LARGAN Precision Co., Ltd., Taichung (TW)

(72) Inventors: Chih-Wen Hsu, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/558,014

(22) Filed: Dec. 2, 2014

(65) Prior Publication Data

US 2016/0116706 A1    Apr. 28, 2016

(30) Foreign Application Priority Data

Oct. 24, 2014   (TW) .............................. 103136836 A

(51) Int. Cl.
| | |
|---|---|
| *G02B 9/34* | (2006.01) |
| *G02B 13/00* | (2006.01) |
| *G02B 13/18* | (2006.01) |
| *H04N 5/225* | (2006.01) |

(52) U.S. Cl.
CPC .............. *G02B 13/004* (2013.01); *G02B 9/34* (2013.01); *G02B 13/18* (2013.01); *H04N 5/2253* (2013.01); *H04N 5/2254* (2013.01)

(58) Field of Classification Search
CPC ............................ G02B 9/34; G02B 13/004
USPC .................................................. 359/715, 773
See application file for complete search history.

(56) References Cited

U.S. PATENT DOCUMENTS

| | | | |
|---|---|---|---|
| 7,692,877 B2 | 4/2010 | Tang et al. | |
| 8,179,470 B2 | 5/2012 | Chen et al. | |

(Continued)

FOREIGN PATENT DOCUMENTS

TW      201326885 A    7/2013

*Primary Examiner* — Darryl J Collins
(74) *Attorney, Agent, or Firm* — Locke Lord LLP; Tim Tingkang Xia, Esq.

(57) ABSTRACT

An optical lens system includes, in order from an object side to an image side, a first lens element, a second lens element, a third lens element and a fourth lens element. The first lens element with positive refractive power has an object-side surface being convex in a paraxial region thereof. The second lens element has negative refractive power. The third lens element with positive refractive power has an image-side surface being convex in a paraxial region thereof, wherein both of the surfaces thereof are aspheric. The fourth lens element with negative refractive power has an image-side surface being concave in a paraxial region thereof, wherein the image-side surface of the fourth lens element has at least one convex shape in an off-axis region thereof, and both of the surfaces thereof are aspheric. The optical lens system has a total of four lens elements with refractive power.

24 Claims, 19 Drawing Sheets

(56) References Cited

U.S. PATENT DOCUMENTS

| | | |
|---|---|---|
| 8,670,189 B2 | 3/2014 | Tsai et al. |
| 8,760,776 B2 | 6/2014 | Hsieh et al. |
| 8,817,391 B2 | 8/2014 | Chen |
| 2009/0015944 A1* | 1/2009 | Taniyama ............ G02B 13/004 359/773 |
| 2011/0019281 A1* | 1/2011 | Iba ........................ G02B 7/022 359/613 |
| 2011/0075271 A1* | 3/2011 | Tang .................... G02B 13/004 359/715 |
| 2011/0261470 A1* | 10/2011 | Chen .................... G02B 13/004 359/715 |
| 2012/0013998 A1* | 1/2012 | Tang ........................ G02B 9/34 359/715 |
| 2012/0229695 A1* | 9/2012 | Iba .......................... G02B 9/34 348/360 |
| 2013/0026352 A1* | 1/2013 | Chou ................... G02B 13/004 250/234 |
| 2014/0022651 A1* | 1/2014 | Chen ....................... G02B 3/00 359/772 |
| 2014/0055870 A1 | 2/2014 | Chang et al. |

\* cited by examiner

OPTICAL LENS SYSTEM, IMAGE CAPTURING UNIT AND ELECTRONIC DEVICE

RELATED APPLICATIONS

This application claims priority to Taiwan Application 103136836, filed on Oct. 24, 2014, which is incorporated by reference herein in its entirety.

BACKGROUND

1. Technical Field

The present disclosure relates to an optical lens system, an image capturing unit and an electronic device, more particularly to an optical lens system and an image capturing unit applicable to an electronic device.

2. Description of Related Art

In recent years, with the popularity of electronic devices having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a third-element lens structure. Due to the popularity of mobile terminals with high-end specifications, such as smart phones, tablet personal computers, wearable apparatus and driving assist devices, the requirements for high resolution and image quality of present compact optical systems increase significantly. However, the conventional optical systems cannot satisfy these requirements of the compact optical systems.

Other conventional compact optical systems with four-element lens structure are developed to enhance resolution and image quality. However, since the second lens element is too thin to be manufactured, the optical system is easy to become fragile, which lacks stability for the optical lens system. Therefore, the functionality of telephoto is worse, which is not favorable for capturing an imaging object far away from the optical system. Moreover, the optical system with insufficient telephoto performance excessively enlarges a chief ray angle of the optical system, which causes the reduction of a relative illumination of the optical system, thereby resulting in vignetting at the peripheral region of the image.

SUMMARY

According to one aspect of the present disclosure, an optical lens system includes, in order from an object side to an image side, a first lens element, a second lens element, a third lens element and a fourth lens element. The first lens element with positive refractive power has an object-side surface being convex in a paraxial region thereof. The second lens element has negative refractive power. The third lens element with positive refractive power has an image-side surface being convex in a paraxial region thereof, wherein both of an object-side surface and the image-side surface of the third lens element are aspheric. The fourth lens element with negative refractive power has an image-side surface being concave in a paraxial region thereof, wherein the image-side surface of the fourth lens element has at least one convex shape in an off-axis region thereof, and both of an object-side surface and the image-side surface of the fourth lens element are aspheric. The optical lens system has a total of four lens elements with refractive power. An air gap in a paraxial region is between any two of the first lens element, the second lens element, the third lens element and the fourth lens element that are adjacent to each other. When a central thickness of the second lens element is CT2, a central thickness of the fourth lens element is CT4, an axial distance between the first lens element and the second lens element is T12, an axial distance between the second lens element and the third lens element is T23, an axial distance between the third lens element and the fourth lens element is T34, the following conditions are satisfied:

$1.45 < CT2/CT4$; and $0.85 < T12/(T23+T34)$.

According to another aspect of the present disclosure, an optical lens system includes, in order from an object side to an image side, a first lens element, a second lens element, a third lens element and a fourth lens element. The first lens element with positive refractive power has an object-side surface being convex in a paraxial region thereof. The second lens element has negative refractive power. The third lens element with positive refractive power has an image-side surface being convex in a paraxial region thereof, wherein both of an object-side surface and the image-side surface of the third lens element are aspheric. The fourth lens element with negative refractive power has an image-side surface being concave in a paraxial region thereof, wherein the image-side surface of the fourth lens element has at least one convex shape in an off-axis region thereof, and both of an object-side surface and the image-side surface of the fourth lens element are aspheric. The optical lens system has a total of four lens elements with refractive power. An air gap in a paraxial region is between any two of the first lens element, the second lens element, the third lens element and the fourth lens element that are adjacent to each other. When a central thickness of the second lens element is CT2, a central thickness of the fourth lens element is CT4, an axial distance between the first lens element and the second lens element is T12, an axial distance between the second lens element and the third lens element is T23, an axial distance between the third lens element and the fourth lens element is T34, the following conditions are satisfied:

$1.33 < CT2/CT4$; and $0.95 < T12/(T23+T34)$.

According to still another aspect of the present disclosure, an image capturing unit includes the optical lens system according to the aforementioned aspect and an image sensor, wherein the image sensor is disposed on the image side of the optical lens system.

According to yet another aspect of the present disclosure, an electronic device includes the image capturing unit according to the aforementioned aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
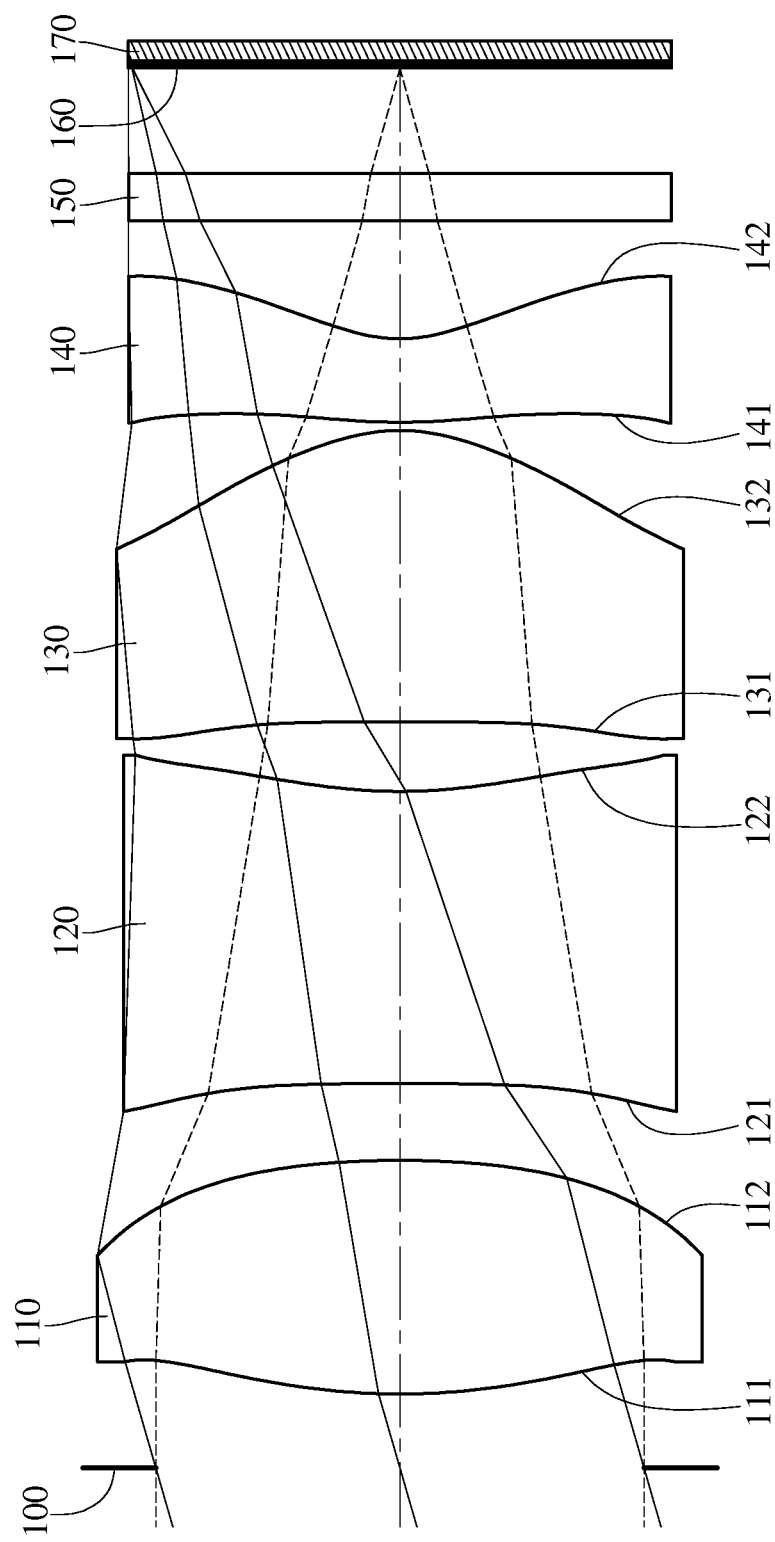
FIG. 1 is a schematic view of an image capturing unit according to the 1st embodiment of the present disclosure.

An optical lens system includes, in order from an object side to an image side, a first lens element, a second lens element, a third lens element and a fourth lens element. The optical lens system has a total of four lens elements with refractive power.

According to the optical lens system of the present disclosure, an air gap in a paraxial region is arranged between any two of the first lens element, the second lens element, the third lens element and the fourth lens element that are adjacent to each other, that is, each of the first through four lens elements of the optical lens system is a single and non-cemented lens element. Moreover, the manufacturing process of the cemented lenses is more complex than the non-cemented lenses. In particular, an image-side surface of one lens element and an object-side surface of the following lens element need to have accurate curvature to ensure these two lens elements will be highly cemented. However, during the cementing process, those two lens elements might not be highly cemented due to displacement and it is thereby not favorable for the image quality of the photographing optical lens assembly. Therefore, there is an air gap in a paraxial region between any two of the first lens element, the second lens element, the third lens element and the fourth lens element that are adjacent to each other in the present disclosure for solving the problem generated by the cemented lens elements.

The first lens element with positive refractive power has an object-side surface being convex in a paraxial region thereof. Therefore, the first lens element provides the optical lens system with the positive refractive power as the optical lens system needs to be. Furthermore, the first lens element can be made of glass material, and both of the object-side surface and an image-side surface of the first lens element can be spherical.

The second lens element has negative refractive power. Therefore, the second lens element with negative refractive power and the first lens element with positive refractive power together form a telephoto structure with positive-negative lens elements so as to effectively reduce a total track length of the optical lens system.

The third lens element has positive refractive power. The third lens element can have an object-side surface being convex in a paraxial region thereof. The third lens element has an image-side surface being convex in a paraxial region thereof. Therefore, it is favorable for balancing the arrangement of the positive refractive powers of the optical lens system so as to reduce the sensitivity of the optical lens system and effectively correct the aberration of the optical lens system.

The fourth lens element has negative refractive power. The fourth lens element can have an object-side surface being convex in a paraxial region thereof. The fourth lens element has an image-side surface being concave in a paraxial region thereof, and the image-side surface of the fourth lens element has at least one convex shape in an off-axis region thereof. Therefore, it is favorable for correcting the astigmatism of the optical lens system and the aberration of the off-axis.

When a central thickness of the second lens element is CT2, a central thickness of the fourth lens element is CT4, the following condition is satisfied: $1.33<CT2/CT4$. Therefore, the thickness of the second lens element is favorable for strengthening the negative refractive power of the second lens element so as to provide the optical lens system with enhanced telephoto performance. Furthermore, the thickness of the second lens element is favorable for preventing the second lens element from unfavorable molding problems so as to prevent the structure of the optical lens system from becoming overly fragile, thereby improving the stability of the optical lens system. Preferably, the following condition is satisfied: $1.45<CT2/CT4$. More preferably, the following condition is satisfied: $1.80<CT2/CT4<5.0$.

When an axial distance between the first lens element and the second lens element is T12, an axial distance between the second lens element and the third lens element is T23, an axial distance between the third lens element and the fourth lens element is T34, the following condition is satisfied: $0.85<T12/(T23+T34)$. Therefore, the second lens element with greater thickness and the axial distances between any two adjacent lens elements are favorable for providing the optical lens system with enhanced telephoto performance. Thus, it is favorable for reducing the chief ray angle of the optical lens system so as to keep the relative illumination of the optical lens system sufficient, thereby avoiding resulting in vignetting at the peripheral region of the image. Furthermore, it is favorable for keeping the optical lens system compact. Preferably, the following condition is satisfied: $0.95<T12/(T23+T34)$. More preferably, the following condition is satisfied: $1.20<T12/(T23+T34)$.

When the central thickness of the second lens element is CT2, the axial distance between the first lens element and the second lens element is T12, the axial distance between the second lens element and the third lens element is T23, the axial distance between the third lens element and the fourth lens element is T34, the following condition is satisfied: $0.80<CT2/(T12+T23+T34)<3.0$. Therefore, it is favorable for adjusting the thickness of the second lens element and the axial distances between any two adjacent lens elements so as to better assemble the optical lens system and further keep a compact size thereof. Preferably, the following condition is satisfied: $1.0<CT2/(T12+T23+T34)<3.0$. When a focal length of the optical lens system is f, a focal length of the third lens element is f3, a focal length of the fourth lens element is f4, the following condition is satisfied: $4.5<|f/f3|+|f/f4|<7.0$. Therefore, it is favorable for providing the optical lens system with retrofocus (reversed telephoto) performance so as to obtain a longer back focal length of the optical lens system, thereby it is favorable for reducing the chief ray angle of the optical lens system.

When a maximum image height of the optical lens system (half of a diagonal length of an effective photosensitive area of an image sensor) is ImgH, the focal length of the optical lens system is f, the following condition is satisfied: $0.20<ImgH/f<0.50$. Therefore, it is favorable for keeping the optical lens system compact so as to be equipped in an electronic device.

When a focal length of the first lens element is f1, a focal length of the second lens element is f2, the following condition is satisfied: $-0.90<f2/f1<-0.30$. Therefore, it is favorable for avoiding overloading the refractive power on the second lens element so as to reduce the aberration and the sensitivity of the optical lens system.

When the focal length of the optical lens system is f, a curvature radius of the image-side surface of the fourth lens element is R8, the following condition is satisfied: $4.7<f/R8$. Therefore, it is favorable for effectively correcting the Petzval's sum of the optical lens system so as to improve the flatness of the image surface.

When the central thickness of the second lens element is CT2, an axial distance between the image-side surface of the fourth lens element and an image surface is BFL (That is, an air conversion distance between the image-side surface of the fourth lens element and the image surface), the following condition is satisfied: $0.65<CT2/BFL<1.5$. Therefore, it is favorable for adjusting the negative refractive power of the second lens element and the back focal length of the optical lens system so as to provide the optical lens system with an enhanced telephoto performance. Furthermore, the back focal length of the photographing optical lens assembly is sufficient for disposing additional opto-mechanical components.

When a curvature radius of the object-side surface of the first lens element is R1, a curvature radius of an image-side surface of the first lens element is R2, the following condition is satisfied: $-1.15<(R1+R2)/(R1-R2)<0.50$. Therefore, it is favorable for minimizing the refractive degree of the incident light so as to avoid excessive aberration.

When an entrance pupil diameter of the optical lens system is EPD, the axial distance between the first lens element and the second lens element is T12, the axial distance between the second lens element and the third lens element is T23, the axial distance between the third lens element and the fourth lens element is T34, the following condition is satisfied: $1.8<EPD/(T12+T23+T34)<3.0$. Therefore, it is favorable for providing sufficient amount of incident light and keeping the optical lens system compact.

When half of a maximal field of view of the optical lens system is HFOV, the following condition is satisfied: $0.40<\tan(2*HFOV)<1.20$. Therefore, it is favorable for providing the optical lens system having enhanced telephoto performance with a sufficient field of view as the optical lens system needs to be.

According to the optical lens system of the present disclosure, an aperture stop can be configured as a front stop or a middle stop. A front stop disposed between an imaged object and the first lens element can provide a longer distance between an exit pupil of the optical lens system and the image surface and thereby improves the image-sensing efficiency of an image sensor (for example, CCD or CMOS). A middle stop disposed between the first lens element and the image surface is favorable for enlarging the field of view of the optical lens system and thereby provides a wider field of view for the same.

According to the optical lens system of the present disclosure, the lens elements thereof can be made of glass or plastic material. When the lens elements are made of glass material, the distribution of the refractive power of the optical lens system may be more flexible to design. When the lens elements are made of plastic material, the manufacturing cost can be effectively reduced. Furthermore, surfaces of each lens element can be arranged to be aspheric or spherical. The aspheric surface of the lens element is easy to form a shape other than spherical surface so as to have more controllable variables for eliminating the aberration thereof, and to further decrease the required number of the lens elements. Therefore, the total track length of the optical lens system can also be reduced.

According to the optical lens system of the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the optical lens system of the present disclosure, an image surface of the optical lens system, based on the corresponding image sensor, can be flat or curved, especially a curved surface being concave facing towards the object side of the optical lens system.

According to the optical lens system of the present disclosure, the optical lens system can include at least one stop, such as an aperture stop, a glare stop or a field stop. Said glare stop or said field stop is set for eliminating the stray light and thereby improving the image quality thereof.

According to the present disclosure, an image capturing unit is provided. The image capturing unit includes the optical lens system according to the aforementioned optical lens system of the present disclosure, and an image sensor, wherein the image sensor is disposed on the image side of the aforementioned optical lens system, that is, the image sensor can be disposed on or near an image surface of the aforementioned optical lens system. In some embodiments, the image capturing unit can further include a barrel member, a holding member or a combination thereof.

Figure 20:
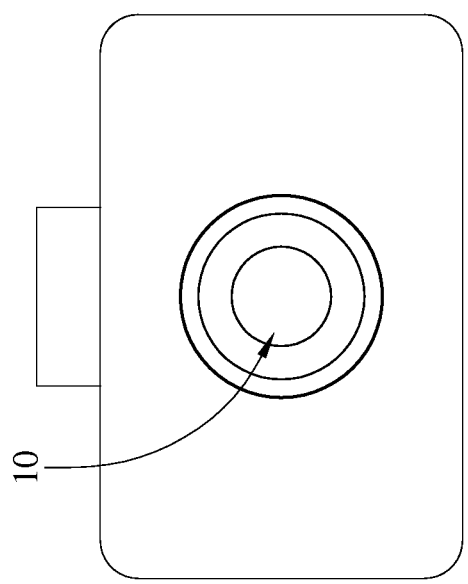
FIG. 20 shows an electronic device according to yet another embodiment.

In FIG. 17, FIG. 18, FIG. 19 and FIG. 20, an image capturing device 10 may be installed in, but not limited to, an electronic device, including a smart phone (FIG. 17), a tablet personal computer (FIG. 18), a wearable device (FIG. 19) or a driving recorder (FIG. 20). The four exemplary figures of different kinds of electronic device are only exemplary for showing the image capturing device of present disclosure installing in an electronic device and is not limited thereto. In some embodiments, the electronic device can further include, but not limited to, a display unit, a control unit, a storage unit, a random access memory unit (RAM), a read only memory unit (ROM) or a combination thereof.

According to the optical lens system of the present disclosure, the optical lens system can be optionally applied to moving focus optical systems. Furthermore, the optical lens system is featured with good capability in the correction of aberration and high image quality, and can be applied to 3D (three-dimensional) image capturing applications, in products such as digital cameras, mobile devices, digital tablets, wearable devices, smart televisions, wireless monitoring devices, motion sensing input devices, driving recorders, rear view cameras and other electronic imaging devices. In addition to imaging capturing devices, motion sensing input devices or driving recorders, the optical lens system can be also optionally applied to driving assist devices, such as lane departure warning system (LDWS) and automatic pilot system, or video image detection devices. According to the above description of the present disclosure, the following specific embodiments are provided for further explanation.

1st Embodiment

Figure 2:
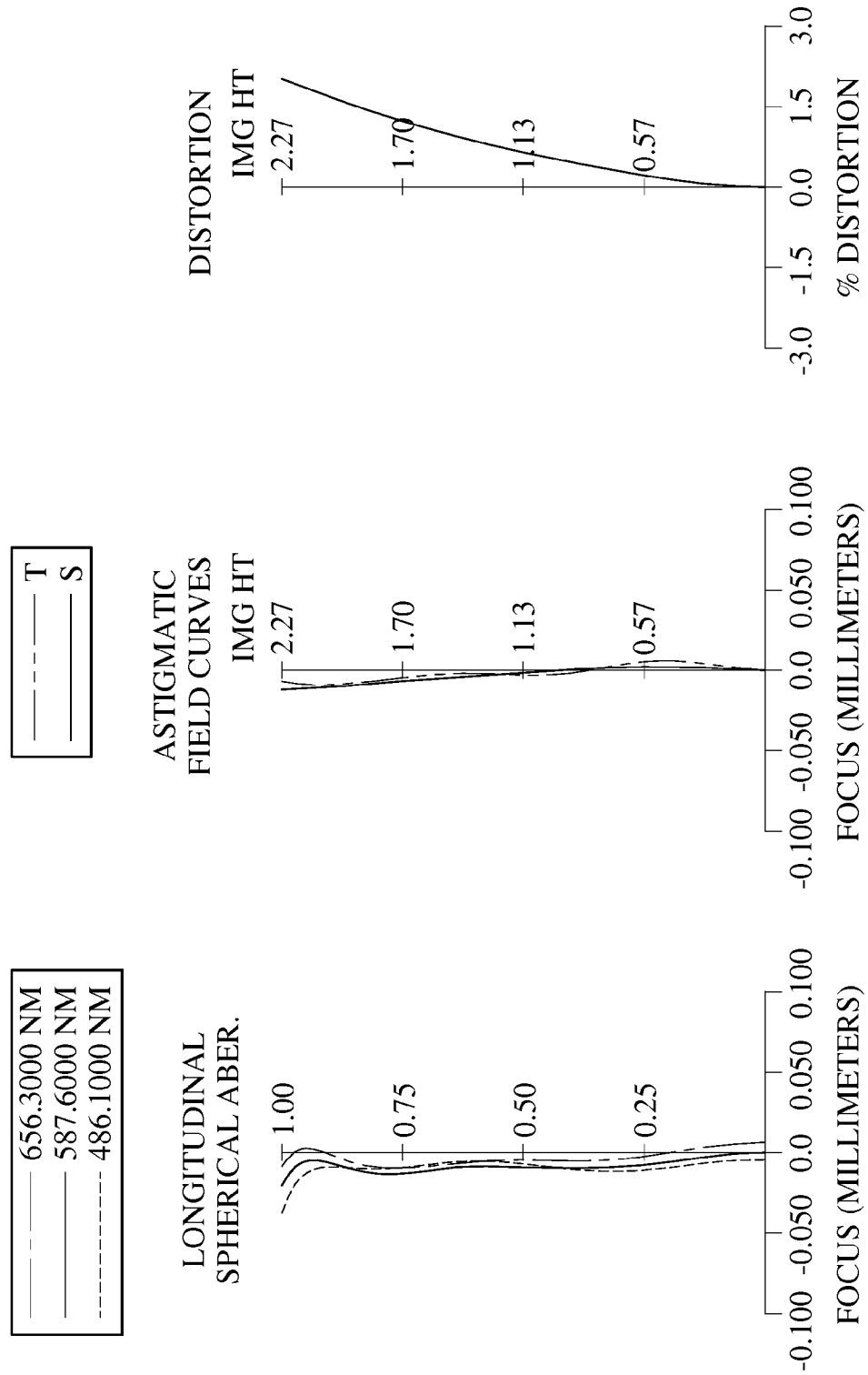
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical lens system (its reference numeral is omitted) of the present disclosure and an image sensor 170. The optical lens system includes, in order from an object side to an image side, an aperture stop 100, a first lens element 110, a second lens element 120, a third lens element 130, a fourth lens element 140, an IR-cut filter 150 and an image surface 160, wherein the optical lens system has a total of four non-cemented lens elements (110-140) with refractive power. There is an air gap in a paraxial region between any two of the first lens element 110, the second lens element 120, the third lens element 130 and the fourth lens element 140 that are adjacent to each other.

The first lens element 110 with positive refractive power has an object-side surface 111 being convex in a paraxial region thereof and an image-side surface 112 being convex in a paraxial region thereof. The first lens element 110 is made of plastic material, and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material, and has the object-side surface 121 and the image-side surface 122 being both aspheric.

The third lens element 130 with positive refractive power has an object-side surface 131 being concave in a paraxial region thereof and an image-side surface 132 being convex in a paraxial region thereof. The third lens element 130 is made of plastic material, and has the object-side surface 131 and the image-side surface 132 being both aspheric.

The fourth lens element 140 with negative refractive power has an object-side surface 141 being convex in a paraxial region thereof and an image-side surface 142 being concave in a paraxial region thereof. The fourth lens element 140 is made of plastic material, and has the object-side surface 141 and the image-side surface 142 being both aspheric. The image-side surface 142 of the fourth lens element 140 has at least one convex shape in an off-axis region thereof.

The IR-cut filter 150 is made of glass and located between the fourth element 140 and the image surface 160, and will not affect the focal length of the optical lens system. The image sensor 170 is disposed on or near the image surface 160 of the optical lens system.

The equation of the aspheric surface profiles of the aforementioned lens elements of the 1st embodiment is expressed as follows:

$$X(Y)=(Y^2/R)/(1+\mathrm{sqrt}(1-(1+k)\times(Y/R)^2))+\Sigma_i(Ai)\times(Y^i)$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the optical lens system of the image capturing unit according to the 1st embodiment, when a focal length of the optical lens system is f, an f-number of the optical lens system is Fno, and half of a maximal field of view of the optical lens system is HFOV, these parameters have the following values: f=7.72 mm; Fno=1.87; and HFOV=16.1 degrees.

When a central thickness of the second lens element 120 is CT2, a central thickness of the fourth lens element 140 is CT4, the following condition is satisfied: CT2/CT4=3.50.

When the central thickness of the second lens element 120 is CT2, an axial distance between the first lens element 110 and the second lens element 120 is T12, an axial distance between the second lens element 120 and the third lens element 130 is T23, an axial distance between the third lens element 130 and the fourth lens element 140 is T34, the following condition is satisfied: CT2/(T12+T23+T34)=1.89.

When the central thickness of the second lens element 120 is CT2, an axial distance between the image-side surface 142 of the fourth lens element 140 and the image surface 160 is BFL, the following condition is satisfied: CT2/BFL=1.14.

When the axial distance between the first lens element 110 and the second lens element 120 is T12, the axial distance between the second lens element 120 and the third lens element 130 is T23, the axial distance between the third lens element 130 and the fourth lens element 140 is T34, the following condition is satisfied: T12/(T23+T34)=0.98.

When an entrance pupil diameter of the optical lens system is EPD, the axial distance between the first lens element 110 and the second lens element 120 is T12, the axial distance between the second lens element 120 and the third lens element 130 is T23, the axial distance between the third lens element 130 and the fourth lens element 140 is T34, the following condition is satisfied: EPD/(T12+T23+T34)=3.15.

When a maximum image height of the optical lens system is ImgH, the focal length of the optical lens system is f, the following condition is satisfied: ImgH/f=0.29.

When a curvature radius of the object-side surface 111 of the first lens element 110 is R1, a curvature radius of the image-side surface 112 of the first lens element 110 is R2, the following condition is satisfied: (R1+R2)/(R1−R2)=−0.18.

When the focal length of the optical lens system is f, a curvature radius of the image-side surface 142 of the fourth lens element 140 is R8, the following condition is satisfied: f/R8=6.32.

When a focal length of the first lens element 110 is f1, a focal length of the second lens element 120 is f2, the following condition is satisfied: f2/f1=−1.01.

When the focal length of the optical lens system is f, a focal length of the third lens element 130 is f3, a focal length of the fourth lens element 140 is f4, the following condition is satisfied: If |f3|+|f/f4|=5.10.

When half of the maximal field of view of the optical lens system is HFOV, the following condition is satisfied: tan (2*HFOV)=0.63.

The detailed optical data of the 1st embodiment are shown in Table 1 and the aspheric surface data are shown in Table 2 below.

TABLE 1

1st Embodiment
f = 7.72 mm, Fno = 1.87, HFOV = 16.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | | | 0.626 | | | | |
| 2 | Lens 1 | 5.759 | (ASP) | 1.980 | Plastic | 1.544 | 55.9 | 6.55 |
| 3 | | −8.205 | (ASP) | 0.650 | | | | |
| 4 | Lens 2 | −123.105 | (ASP) | 2.476 | Plastic | 1.650 | 21.5 | −6.64 |
| 5 | | 4.515 | (ASP) | 0.590 | | | | |
| 6 | Lens 3 | −82.939 | (ASP) | 2.468 | Plastic | 1.544 | 55.9 | 2.86 |
| 7 | | −1.543 | (ASP) | 0.070 | | | | |
| 8 | Lens 4 | 5.044 | (ASP) | 0.707 | Plastic | 1.535 | 55.7 | −3.22 |
| 9 | | 1.221 | (ASP) | 1.000 | | | | |
| 10 | IR-cut filter | Plano | | 0.400 | Glass | 1.517 | 64.2 | — |
| 11 | | Plano | | 0.899 | | | | |
| 12 | Image | Plano | | — | | | | |

Note:
Reference wavelength is 587.6 nm (d-line).

TABLE 2

Aspheric Coefficients

| Surface # | 2 | 3 | 4 | 5 |
|---|---|---|---|---|
| k = | −1.2336E+00 | 7.4156E+00 | 0.0000E+00 | −3.8145E+00 |
| A4 = | −1.2908E−03 | −6.3565E−03 | −1.2198E−02 | −1.0149E−02 |
| A6 = | −5.7496E−04 | 5.3701E−04 | 2.3471E−04 | −1.6121E−03 |
| A8 = | 5.9016E−05 | −1.2887E−04 | 4.3667E−04 | 9.6847E−04 |
| A10 = | −2.4271E−05 | 9.2503E−06 | −1.8617E−04 | −2.4271E−04 |
| A12 = | — | — | 3.7946E−05 | 4.1098E−05 |
| A14 = | — | — | −2.6131E−06 | −2.6532E−06 |

| Surface # | 6 | 7 | 8 | 9 |
|---|---|---|---|---|
| k = | −1.0000E+00 | −5.1600E+00 | 3.4650E+01 | −4.8009E+00 |
| A4 = | −4.9627E−03 | −2.5611E−02 | −2.1700E−02 | −2.6132E−02 |
| A6 = | −4.3509E−03 | 9.4664E−03 | 2.6797E−03 | 4.6422E−03 |
| A8 = | 1.1763E−03 | −2.8820E−03 | 3.1926E−04 | −5.0421E−04 |
| A10 = | 2.1177E−05 | 6.5360E−04 | −1.0593E−04 | 1.3644E−05 |
| A12 = | −2.4822E−05 | −7.5503E−05 | 5.0677E−06 | 4.4511E−07 |
| A14 = | 1.7845E−06 | 3.2475E−06 | — | — |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A4-14 represent the aspheric coefficients ranging from the 4th order to the 14th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
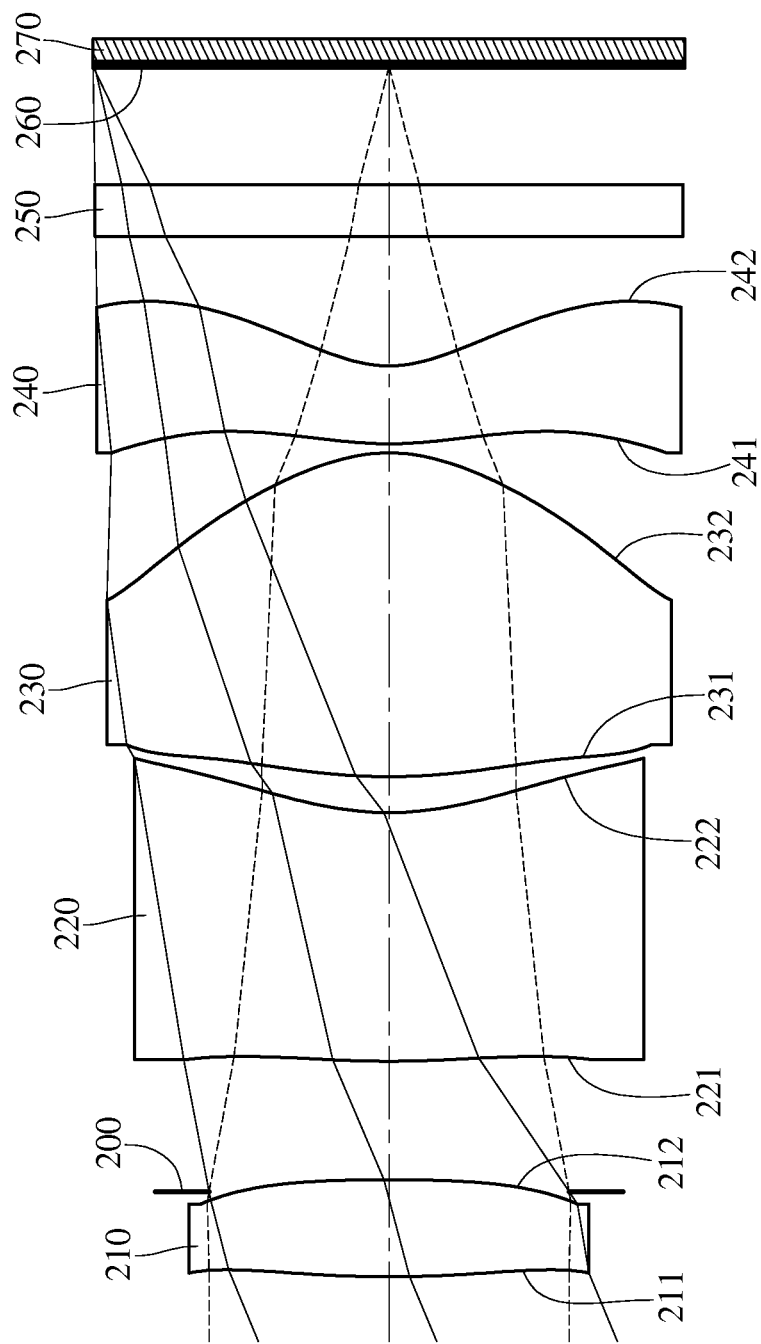
FIG. 3 is a schematic view of an image capturing unit according to the 2nd embodiment of the present disclosure.
Figure 4:
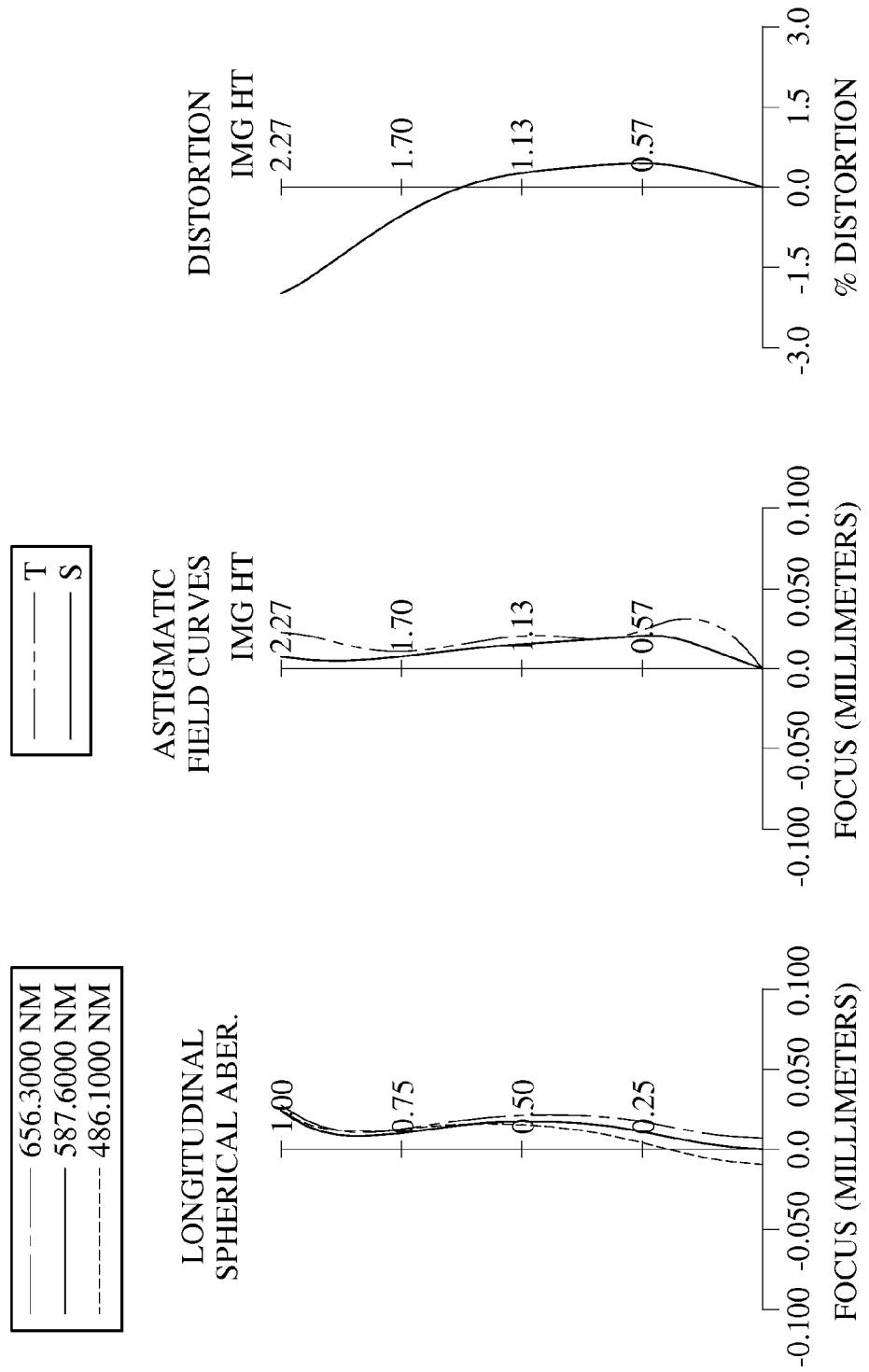
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical lens system (its reference numeral is omitted) of the present disclosure and an image sensor 270. The optical lens system includes, in order from an object side to an image side, a first lens element 210, an aperture stop 200, a second lens element 220, a third lens element 230, a fourth lens element 240, an IR-cut filter 250 and an image surface 260, wherein the optical lens system has a total of four non-cemented lens elements (210-240) with refractive power. There is an air gap in a paraxial region between any two of the first lens element 210, the second lens element 220, the third lens element 230 and the fourth lens element 240 that are adjacent to each other.

The first lens element 210 with positive refractive power has an object-side surface 211 being convex in a paraxial region thereof and an image-side surface 212 being convex in a paraxial region thereof. The first lens element 210 is made of plastic material, and has the object-side surface 211 and the image-side surface 212 being both aspheric.

The second lens element 220 with negative refractive power has an object-side surface 221 being convex in a paraxial region thereof and an image-side surface 222 being concave in a paraxial region thereof. The second lens element 220 is made of plastic material, and has the object-side surface 221 and the image-side surface 222 being both aspheric.

The third lens element 230 with positive refractive power has an object-side surface 231 being convex in a paraxial region thereof and an image-side surface 232 being convex in a paraxial region thereof. The third lens element 230 is made of plastic material, and has the object-side surface 231 and the image-side surface 232 being both aspheric.

The fourth lens element 240 with negative refractive power has an object-side surface 241 being convex in a paraxial region thereof and an image-side surface 242 being concave in a paraxial region thereof. The fourth lens element 240 is made of plastic material, and has the object-side surface 241 and the image-side surface 242 being both aspheric. The image-side surface 242 of the fourth lens element 240 has at least one convex shape in an off-axis region thereof.

The IR-cut filter 250 is made of glass and located between the fourth lens element 240 and the image surface 260, and will not affect the focal length of the optical lens system. The image sensor 270 is disposed on or near the image surface 260 of the optical lens system.

The detailed optical data of the 2nd embodiment are shown in Table 3 and the aspheric surface data are shown in Table 4 below.

TABLE 3

2nd Embodiment
f = 5.55 mm, Fno = 2.00, HFOV = 22.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 8.222 (ASP) | 0.750 | Plastic | 1.544 | 55.9 | 9.81 |
| 2 | | −14.746 (ASP) | −0.092 | | | | |
| 3 | Ape. Stop | Plano | 1.006 | | | | |
| 4 | Lens 2 | 7.976 (ASP) | 1.919 | Plastic | 1.650 | 21.5 | −5.84 |
| 5 | | 2.330 (ASP) | 0.277 | | | | |
| 6 | Lens 3 | 4.521 (ASP) | 2.500 | Plastic | 1.544 | 55.9 | 2.16 |
| 7 | | −1.278 (ASP) | 0.070 | | | | |
| 8 | Lens 4 | 2.914 (ASP) | 0.600 | Plastic | 1.535 | 55.7 | −2.73 |
| 9 | | 0.903 (ASP) | 1.000 | | | | |
| 10 | IR-cut filter | Plano | 0.400 | Glass | 1.517 | 64.2 | — |
| 11 | | Plano | 0.900 | | | | |
| 12 | Image | Plano | — | | | | |

Note:
Reference wavelength is 587.6 nm (d-line).

TABLE 4

Aspheric Coefficients

| Surface # | 1 | 2 | 4 | 5 |
|---|---|---|---|---|
| k = | −2.4222E+01 | 5.6116E+01 | 0.0000E+00 | −3.8171E+00 |
| A4 = | −8.0814E−03 | −2.5733E−02 | −3.1011E−02 | −1.6005E−02 |
| A6 = | −2.6431E−03 | 3.3161E−03 | 2.7457E−03 | −1.6018E−03 |
| A8 = | 2.8629E−04 | −1.0385E−03 | 8.4116E−04 | 1.2236E−03 |
| A10 = | −2.9187E−04 | 3.4270E−05 | −3.2717E−04 | −2.7477E−04 |
| A12 = | — | — | −7.5006E−05 | 2.9149E−05 |
| A14 = | — | — | 3.4137E−05 | 9.9425E−07 |

TABLE 4-continued

Aspheric Coefficients

| Surface # | 6 | 7 | 8 | 9 |
|---|---|---|---|---|
| k = | 6.2622E−02 | −3.6508E+00 | −3.4650E+01 | −4.1313E+00 |
| A4 = | −1.4079E−02 | −1.0884E−02 | −9.5129E−03 | −3.6008E−02 |
| A6 = | −5.3609E−03 | −5.3338E−03 | −1.3764E−02 | 3.4877E−03 |
| A8 = | 3.9704E−04 | 2.6413E−03 | 5.4200E−03 | 2.1474E−05 |
| A10 = | 3.7023E−04 | −6.1543E−04 | −8.0889E−04 | −4.9431E−05 |
| A12 = | −2.1540E−05 | 8.0636E−05 | 4.3918E−05 | 3.4480E−06 |
| A14 = | −3.4184E−06 | −2.9940E−06 | — | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 5.55 | EPD/(T12 + T23 + T34) | 2.20 |
| Fno | 2.00 | ImgH/f | 0.41 |
| HFOV [deg.] | 22.6 | (R1 + R2)/(R1 − R2) | −0.28 |
| CT2/CT4 | 3.20 | f/R8 | 6.15 |
| CT2/(T12 + T23 + T34) | 1.52 | f2/f1 | −0.60 |
| CT2/BFL | 0.89 | |f/f3| + |f/f4| | 4.60 |
| T12/(T23 + T34) | 2.63 | tan(2 * HFOV) | 1.01 |

3rd Embodiment

Figure 5:
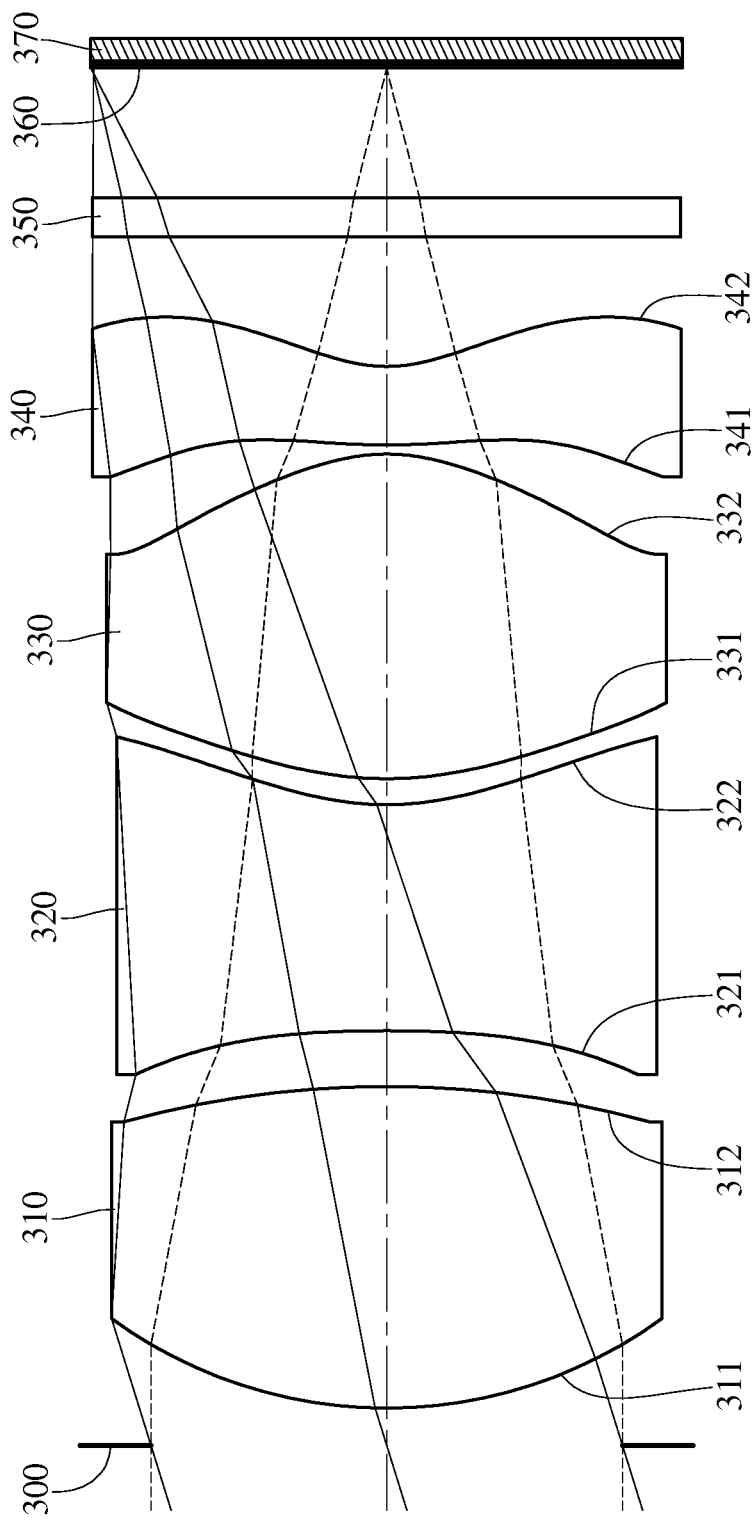
FIG. 5 is a schematic view of an image capturing unit according to the 3rd embodiment of the present disclosure.
Figure 6:
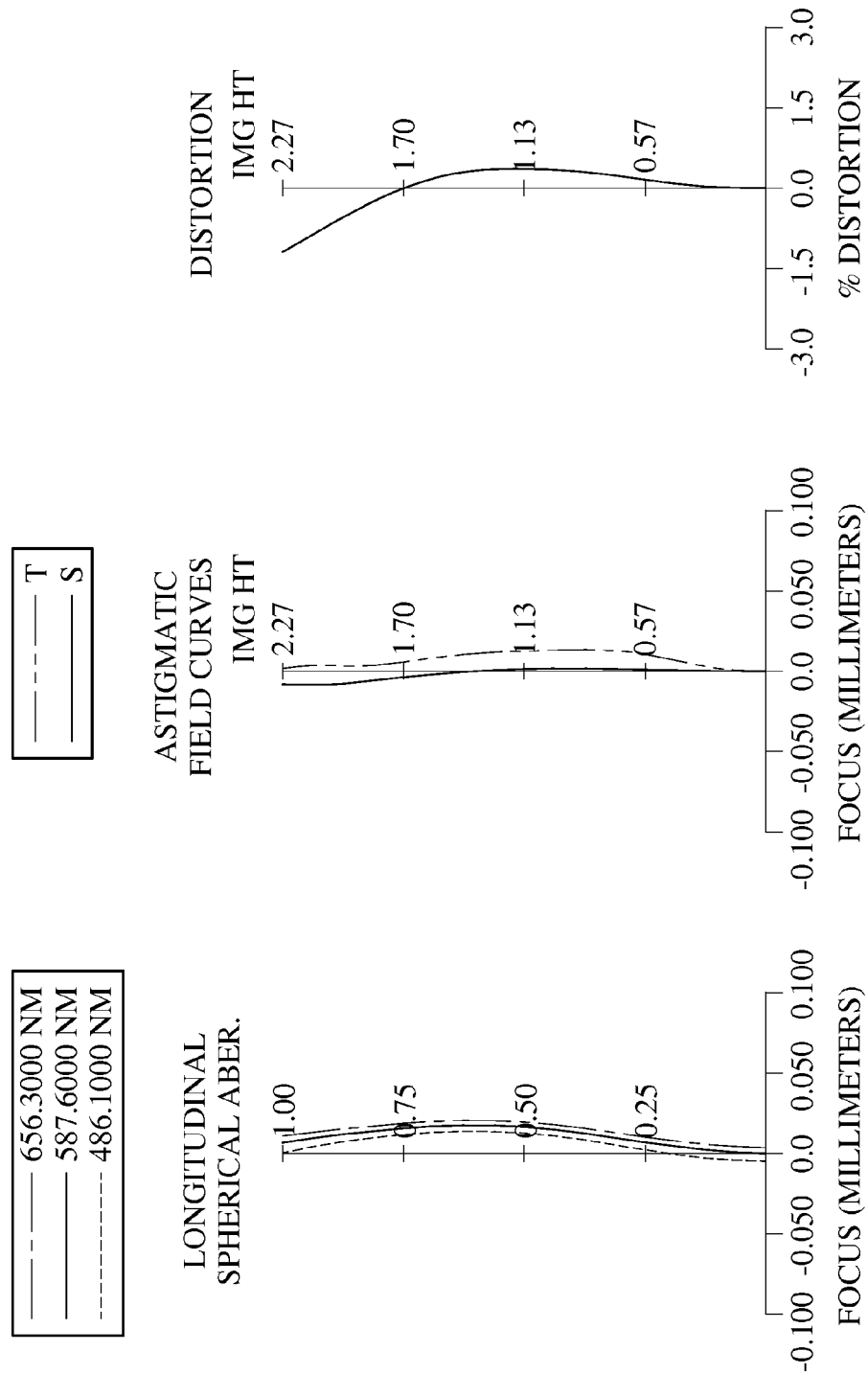
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical lens system (its reference numeral is omitted) of the present disclosure and an image sensor 370. The optical lens system includes, in order from an object side to an image side, an aperture stop 300, a first lens element 310, a second lens element 320, a third lens element 330, a fourth lens element 340, an IR-cut filter 350 and an image surface 360, wherein the optical lens system has a total of four non-cemented lens elements (310-340) with refractive power. There is an air gap in a paraxial region between any two of the first lens element 310, the second lens element 320, the third lens element 330 and the fourth lens element 340 that are adjacent to each other.

The first lens element 310 with positive refractive power has an object-side surface 311 being convex in a paraxial region thereof and an image-side surface 312 being convex in a paraxial region thereof. The first lens element 310 is made of glass material, and has the object-side surface 311 and the image-side surface 312 being both spherical.

The second lens element 320 with negative refractive power has an object-side surface 321 being concave in a paraxial region thereof and an image-side surface 322 being concave in a paraxial region thereof. The second lens element 320 is made of glass material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of plastic material, and has the object-side surface 331 and the image-side surface 332 being both aspheric.

The fourth lens element 340 with negative refractive power has an object-side surface 341 being convex in a paraxial region thereof and an image-side surface 342 being concave in a paraxial region thereof. The fourth lens element 340 is made of plastic material, and has the object-side surface 341 and the image-side surface 342 being both aspheric. The image-side surface 342 of the fourth lens element 340 has at least one convex shape in an off-axis region thereof.

The IR-cut filter 350 is made of glass and located between the fourth lens element 340 and the image surface 360, and will not affect the focal length of the optical lens system. The image sensor 370 is disposed on or near the image surface 360 of the optical lens system.

The detailed optical data of the 3rd embodiment are shown in Table 5 and the aspheric surface data are shown in Table 6 below.

TABLE 5

3rd Embodiment
f = 7.36 mm, Fno = 2.03, HFOV = 17.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.285 | | | | |
| 2 | Lens 1 | 3.594 (SPH) | 2.477 | Glass | 1.497 | 81.6 | 5.31 |
| 3 | | −7.663 (SPH) | 0.430 | | | | |
| 4 | Lens 2 | −11.000 (ASP) | 1.741 | Glass | 1.714 | 38.9 | −2.52 |
| 5 | | 2.297 (ASP) | 0.200 | | | | |
| 6 | Lens 3 | 2.899 (ASP) | 2.500 | Plastic | 1.544 | 55.9 | 2.20 |
| 7 | | 1.417 (ASP) | 0.070 | | | | |
| 8 | Lens 4 | 5.185 (ASP) | 0.604 | Plastic | 1.544 | 55.9 | −2.70 |
| 9 | | 1.097 (ASP) | 1.000 | | | | |
| 10 | IR-cut filter | Plano | 0.300 | Glass | 1.517 | 64.2 | — |
| 11 | | Plano | 1.001 | | | | |
| 12 | Image | Plano | — | | | | |

Note:
Reference wavelength is 587.6 nm (d-line).

TABLE 6

Aspheric Coefficients

| Surface # | 4 | 5 | 6 |
|---|---|---|---|
| k = | 0.0000E+00 | −3.0420E+00 | −1.0000E+00 |
| A4 = | −1.8789E−02 | −1.4384E−02 | −1.0557E−02 |
| A6 = | 3.4283E−03 | −4.3601E−04 | −3.7314E−03 |
| A8 = | −9.1423E−04 | 1.2798E−03 | 1.1035E−03 |
| A10 = | 2.5878E−04 | −3.7062E−04 | 3.8531E−05 |
| A12 = | −5.1195E−05 | 3.8237E−05 | −3.4602E−05 |
| A14 = | 4.6037E−06 | −8.8580E−07 | 2.9805E−06 |

| Surface # | 7 | 8 | 9 |
|---|---|---|---|
| k = | −5.6069E+00 | −4.2060E+01 | −4.8454E+00 |
| A4 = | −1.8887E−02 | −3.4223E−02 | −4.3222E−02 |
| A6 = | 3.9250E−03 | −4.6817E−03 | 6.0775E−03 |
| A8 = | −5.7268E−04 | 2.9230E−03 | −5.2727E−04 |
| A10 = | 6.9348E−05 | −3.5871E−04 | 2.6379E−05 |
| A12 = | 6.5325E−06 | 1.3372E−05 | −1.4721E−06 |
| A14 = | 8.2739E−07 | — | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 7.36 | EPD/(T12 + T23 + T34) | 5.18 |
| Fno | 2.03 | ImgH/f | 0.31 |
| HFOV [deg.] | 17.3 | (R1 + R2)/(R1 − R2) | −0.36 |
| CT2/CT4 | 2.88 | f/R8 | 6.71 |
| CT2/(T12 + T23 + T34) | 2.49 | f2/f1 | −0.47 |
| CT2/BFL | 0.79 | |f/f3| + |f/f4| | 6.07 |
| T12/(T23 + T34) | 1.59 | tan(2 * HFOV) | 0.69 |

4th Embodiment

Figure 7:
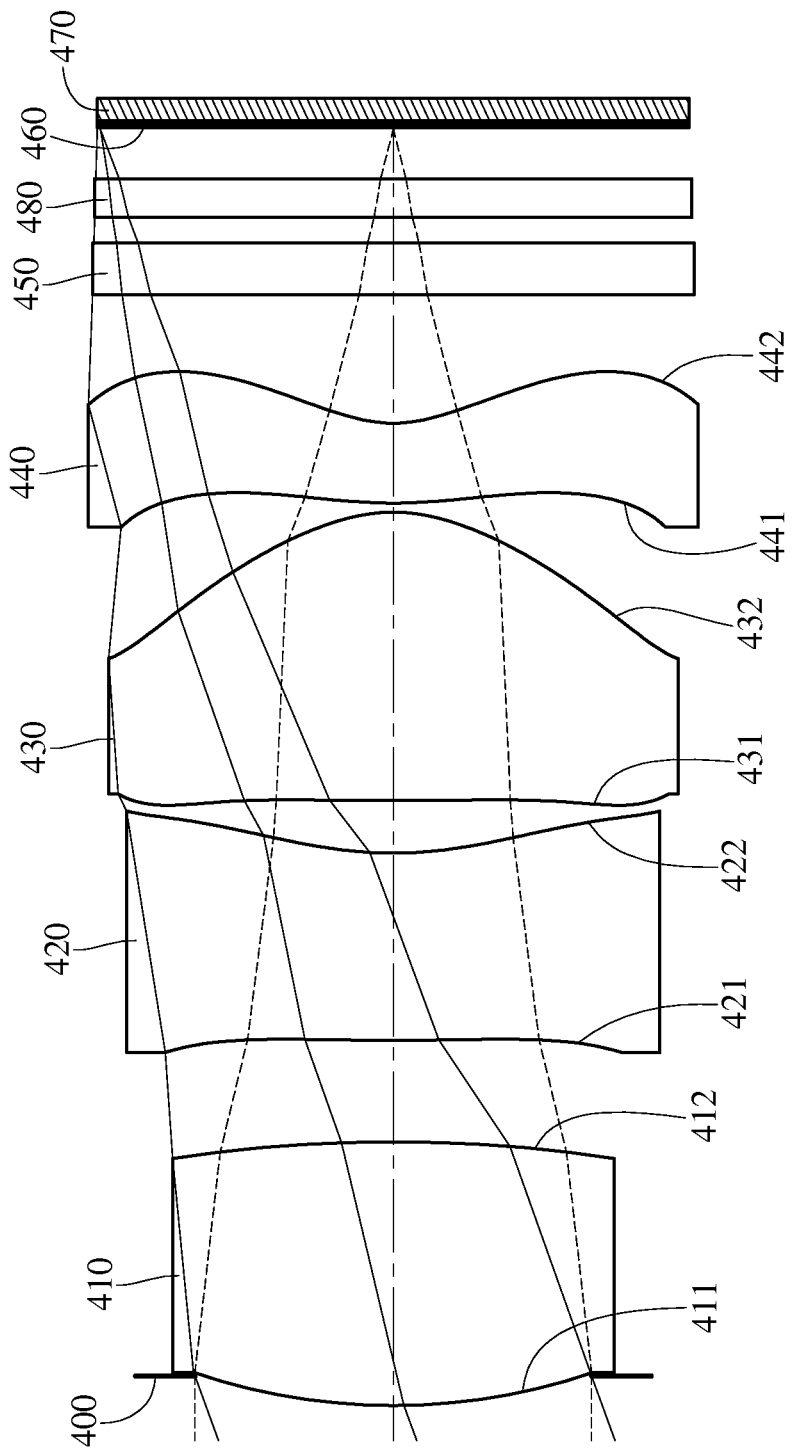
FIG. 7 is a schematic view of an image capturing unit according to the 4th embodiment of the present disclosure.
Figure 8:
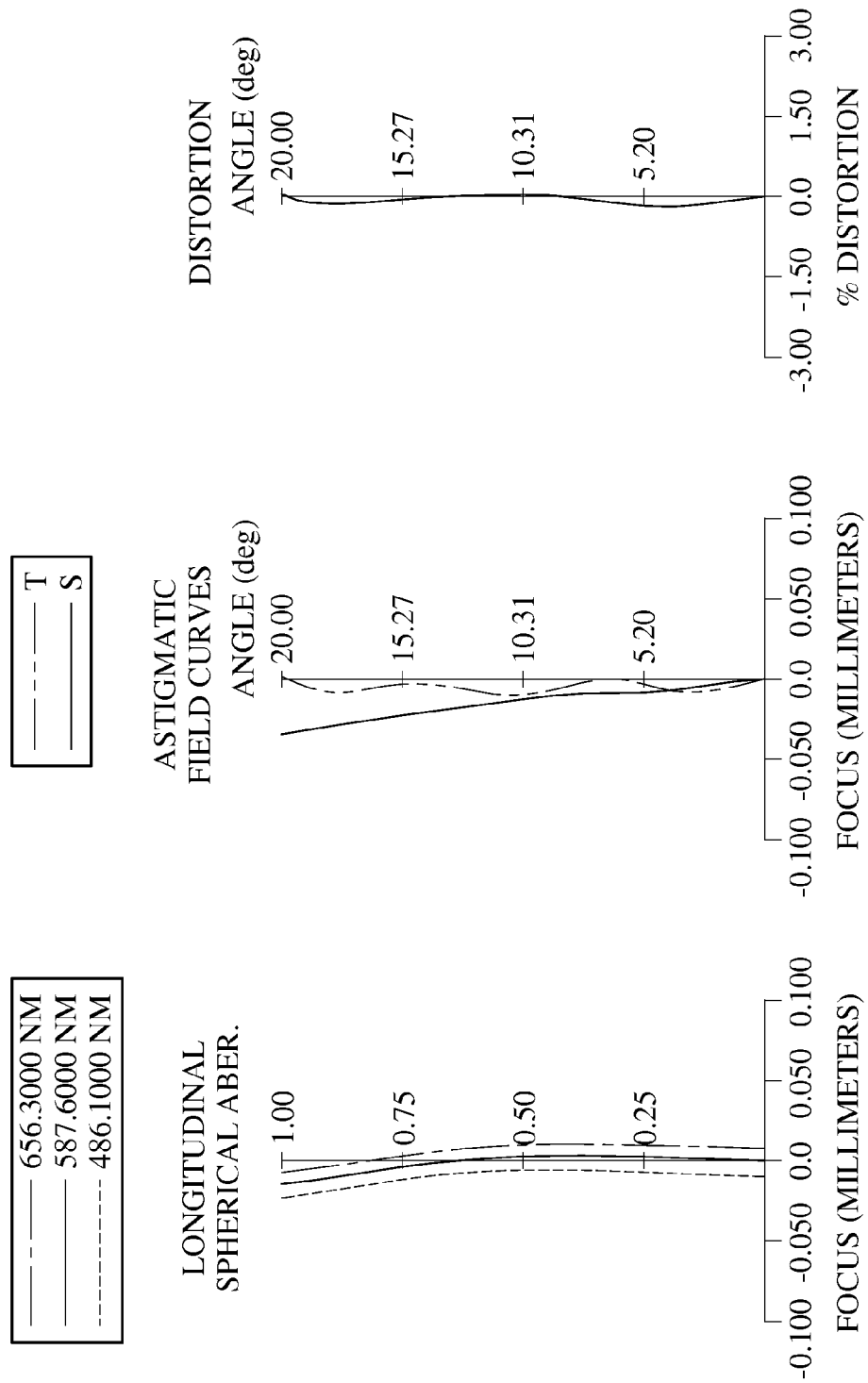
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical lens system (its reference numeral is omitted) of the present disclosure and an image sensor 470. The optical lens system includes, in order from an object side to an image side, an aperture stop 400, a first lens element 410, a second lens element 420, a third lens element 430, a fourth lens element 440, an IR-cut filter 450, a cover-glass 480 and an image surface 460, wherein the optical lens system has a total of four non-cemented lens elements (410-440) with refractive power. There is an air gap in a paraxial region between any two of the first lens element 410, the second lens element 420, the third lens element 430 and the fourth lens element 440 that are adjacent to each other.

The first lens element 410 with positive refractive power has an object-side surface 411 being convex in a paraxial region thereof and an image-side surface 412 being convex in a paraxial region thereof. The first lens element 410 is made of glass material, and has the object-side surface 411 and the image-side surface 412 being both spherical.

The second lens element 420 with negative refractive power has an object-side surface 421 being convex in a paraxial region thereof and an image-side surface 422 being concave in a paraxial region thereof. The second lens element 420 is made of plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of plastic material, and has the object-side surface 431 and the image-side surface 432 being both aspheric.

The fourth lens element 440 with negative refractive power has an object-side surface 441 being convex in a paraxial region thereof and an image-side surface 442 being concave in a paraxial region thereof. The fourth lens element 440 is made of plastic material, and has the object-side surface 441 and the image-side surface 442 being both aspheric. The image-side surface 442 of the fourth lens element 440 has at least one convex shape in an off-axis region thereof.

The IR-cut filter 450 and the cover-glass 480 are both made of glass and are located between the fourth lens element 440 and the image surface 460, and will not affect the focal length of the optical lens system. The image sensor 470 is disposed on or near the image surface 460 of the optical lens system.

The detailed optical data of the 4th embodiment are shown in Table 7 and the aspheric surface data are shown in Table 8 below.

TABLE 7

4th Embodiment
f = 6.25 mm, Fno = 2.03, HFOV = 20.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.228 | | | | |
| 2 | Lens 1 | 4.787 (SPH) | 2.050 | Glass | 1.517 | 64.2 | 6.80 |
| 3 | | −11.297 (SPH) | 0.788 | | | | |
| 4 | Lens 2 | 20.234 (ASP) | 1.455 | Plastic | 1.639 | 23.5 | −5.89 |
| 5 | | 3.084 (ASP) | 0.408 | | | | |
| 6 | Lens 3 | 35.188 (ASP) | 2.241 | Plastic | 1.544 | 55.9 | 2.28 |
| 7 | | −1.256 (ASP) | 0.070 | | | | |
| 8 | Lens 4 | 3.672 (ASP) | 0.621 | Plastic | 1.544 | 55.9 | −2.83 |
| 9 | | 1.020 (ASP) | 1.000 | | | | |
| 10 | IR-cut filter | Plano | 0.400 | Glass | 1.517 | 64.2 | — |
| 11 | | Plano | 0.200 | | | | |
| 12 | Cover-glass | Plano | 0.300 | Glass | 1.517 | 64.2 | — |
| 13 | | Plano | 0.397 | | | | |
| 14 | Image | Plano | — | | | | |

Note:
Reference wavelength is 587.6 nm (d-line).

TABLE 8

Aspheric Coefficients

| Surface # | 4 | 5 | 6 |
|---|---|---|---|
| k = | 0.0000E+00 | −4.3141E+00 | −1.0000E+00 |
| A4 = | −1.8740E−02 | −1.4583E−02 | −5.7545E−03 |
| A6 = | 1.5940E−03 | −1.2602E−03 | −6.4295E−03 |
| A8 = | −4.7199E−04 | 9.0984E−04 | 1.6472E−03 |
| A10 = | 1.6822E−04 | −3.0858E−04 | 1.6863E−04 |
| A12 = | −1.0114E−04 | 6.3426E−05 | −4.1942E−05 |
| A14 = | 1.7923E−05 | −3.6827E−06 | 1.1189E−06 |

| Surface # | 7 | 8 | 9 |
|---|---|---|---|
| k = | −4.0316E+00 | −3.3965E+01 | −4.7844E+00 |
| A4 = | −2.7674E−02 | −1.7680E−02 | −3.9461E−02 |
| A6 = | 4.4232E−03 | −5.4794E−03 | 5.0875E−03 |
| A8 = | −5.4864E−04 | 2.5479E−03 | −5.7708E−04 |
| A10 = | 6.9855E−05 | −3.9164E−04 | 9.6198E−06 |
| A12 = | 4.8881E−06 | 7.8402E−06 | 8.9643E−07 |
| A14 = | −3.3820E−07 | — | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.25 | EPD/(T12 + T23 + T34) | 2.43 |
| Fno | 2.03 | ImgH/f | 0.36 |
| HFOV [deg.] | 20.0 | (R1 + R2)/(R1 − R2) | −0.40 |
| CT2/CT4 | 2.34 | f/R8 | 6.13 |
| CT2/(T12 + T23 + T34) | 1.15 | f2/f1 | −0.87 |
| CT2/BFL | 0.71 | |f/f3| + |f/f4| | 4.95 |
| T12/(T23 + T34) | 1.65 | tan(2 * HFOV) | 0.84 |

5th Embodiment

Figure 9:
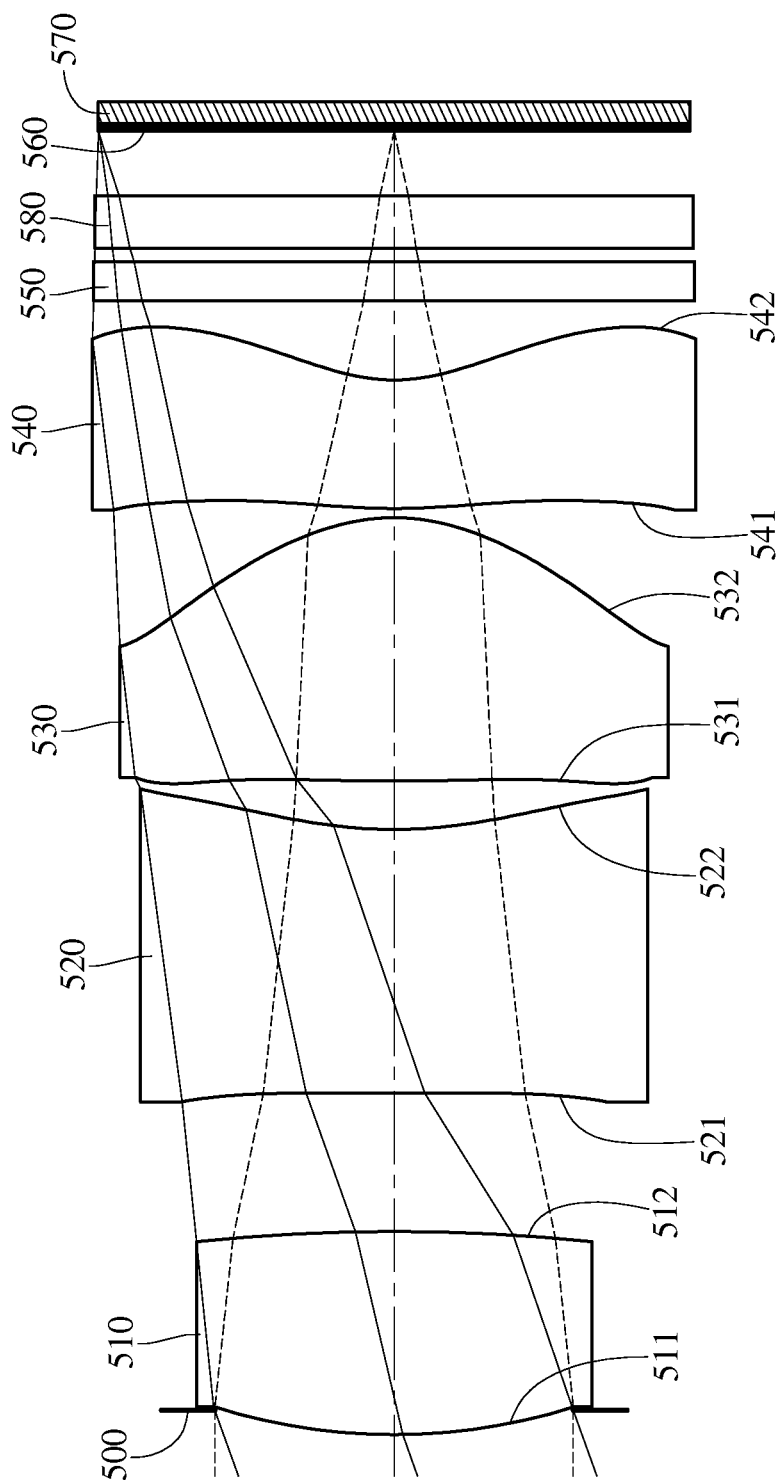
FIG. 9 is a schematic view of an image capturing unit according to the 5th embodiment of the present disclosure.
Figure 10:
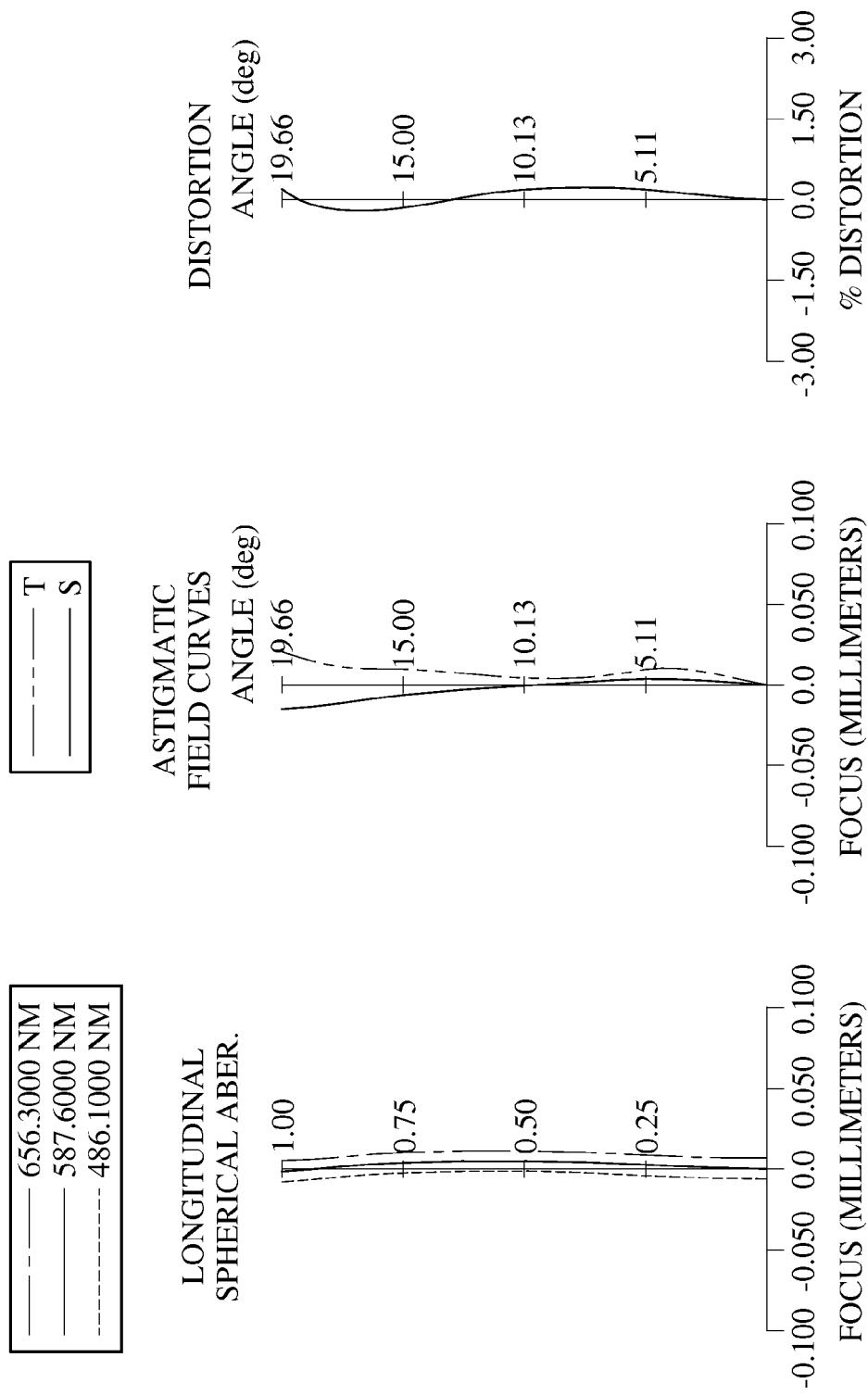
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical lens system (its reference numeral is omitted) of the present disclosure and an image sensor 570. The optical lens system includes, in order from an object side to an image side, an aperture stop 500, a first lens element 510, a second lens element 520, a third lens element 530, a fourth lens element 540, an IR-cut filter 560, a cover-glass 580 and an image surface 560, wherein the optical lens system has a total of four non-cemented lens elements (510-540) with refractive power. There is an air gap in a paraxial region between any two of the first lens element 510, the second lens element 520, the third lens element 530 and the fourth lens element 540 that are adjacent to each other.

The first lens element 510 with positive refractive power has an object-side surface 511 being convex in a paraxial region thereof and an image-side surface 512 being convex in a paraxial region thereof. The first lens element 510 is made of glass material, and has the object-side surface 511 and the image-side surface 512 being both spherical.

The second lens element 520 with negative refractive power has an object-side surface 521 being convex in a paraxial region thereof and an image-side surface 522 being concave in a paraxial region thereof. The second lens element 520 is made of plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of plastic material, and has the object-side surface 531 and the image-side surface 532 being both aspheric.

The fourth lens element 540 with negative refractive power has an object-side surface 541 being convex in a paraxial region thereof and an image-side surface 542 being concave in a paraxial region thereof. The fourth lens element 540 is made of plastic material, and has the object-side surface 541 and the image-side surface 542 being both aspheric. The image-side surface 542 of the fourth lens element 540 has at least one convex shape in an off-axis region thereof.

The IR-cut filter 550 and the cover-glass 580 are both made of glass and are located between the fourth lens element 540 and the image surface 560, and will not affect the focal length of the optical lens system. The image sensor 570 is disposed on or near the image surface 560 of the optical lens system.

The detailed optical data of the 5th embodiment are shown in Table 9 and the aspheric surface data are shown in Table 10 below.

TABLE 9

5th Embodiment
f = 6.25 mm, Fno = 2.30, HFOV = 19.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.184 | | | | |
| 2 | Lens 1 | 4.510 (SPH) | 1.543 | Glass | 1.517 | 64.2 | 6.87 |
| 3 | | −14.727 (SPH) | 1.054 | | | | |
| 4 | Lens 2 | 172.223 (ASP) | 2.000 | Plastic | 1.639 | 23.5 | −5.58 |
| 5 | | 3.477 (ASP) | 0.368 | | | | |
| 6 | Lens 3 | 18.687 (ASP) | 2.000 | Plastic | 1.544 | 55.9 | 2.69 |
| 7 | | −1.529 (ASP) | 0.070 | | | | |
| 8 | Lens 4 | 5.055 (ASP) | 0.976 | Plastic | 1.544 | 55.9 | −3.57 |
| 9 | | 1.306 (ASP) | 0.600 | | | | |
| 10 | IR-cut filter | Plano | 0.300 | Glass | 1.517 | 64.2 | — |
| 11 | | Plano | 0.100 | | | | |
| 12 | Cover-glass | Plano | 0.400 | Glass | 1.517 | 64.2 | — |
| 13 | | Plano | 0.492 | | | | |
| 14 | Image | Plano | — | | | | |

Note:
Reference wavelength is 587.6 nm (d-line).

TABLE 10

Aspheric Coefficients

| Surface # | 4 | 5 | 6 |
|---|---|---|---|
| k = | 0.0000E+00 | −2.8115E+00 | −1.0000E+00 |
| A4 = | −1.1409E−02 | −1.4574E−02 | −9.1092E−03 |
| A6 = | 6.3593E−04 | −1.2261E−03 | −7.7863E−03 |
| A8 = | −4.1892E−04 | 9.0124E−04 | 1.9986E−03 |
| A10 = | 2.6839E−04 | −3.4805E−04 | 3.3046E−04 |
| A12 = | −1.5130E−04 | 8.7702E−05 | −7.2470E−05 |
| A14 = | 2.9419E−05 | −5.8977E−06 | 1.5277E−06 |

TABLE 10-continued

Aspheric Coefficients

| Surface # | 7 | 8 | 9 |
|---|---|---|---|
| k = | −3.1206E+00 | −4.3108E+01 | −4.3745E+00 |
| A4 = | −2.2785E−02 | −2.1873E−02 | −3.7460E−02 |
| A6 = | 3.9095E−03 | −6.6779E−04 | 5.3898E−03 |
| A8 = | −7.8062E−04 | 2.3921E−03 | −4.5282E−04 |
| A10 = | 1.5454E−04 | −5.4072E−04 | −2.2174E−05 |
| A12 = | 2.1912E−05 | 3.4106E−05 | 3.6455E−06 |
| A14 = | −3.2868E−06 | — | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

5th Embodiment

| f [mm] | 6.25 | EPD/(T12 + T23 + T34) | 1.82 |
|---|---|---|---|
| Fno | 2.30 | ImgH/f | 0.36 |
| HFOV [deg.] | 19.7 | (R1 + R2)/(R1 − R2) | −0.53 |
| CT2/CT4 | 2.05 | f/R8 | 4.78 |
| CT2/(T12 + T23 + T34) | 1.34 | f2/f1 | −0.81 |
| CT2/BFL | 1.21 | |f/f3| + |f/f4| | 4.07 |
| T12/(T23 + T34) | 2.41 | tan(2 * HFOV) | 0.82 |

6th Embodiment

Figure 11:
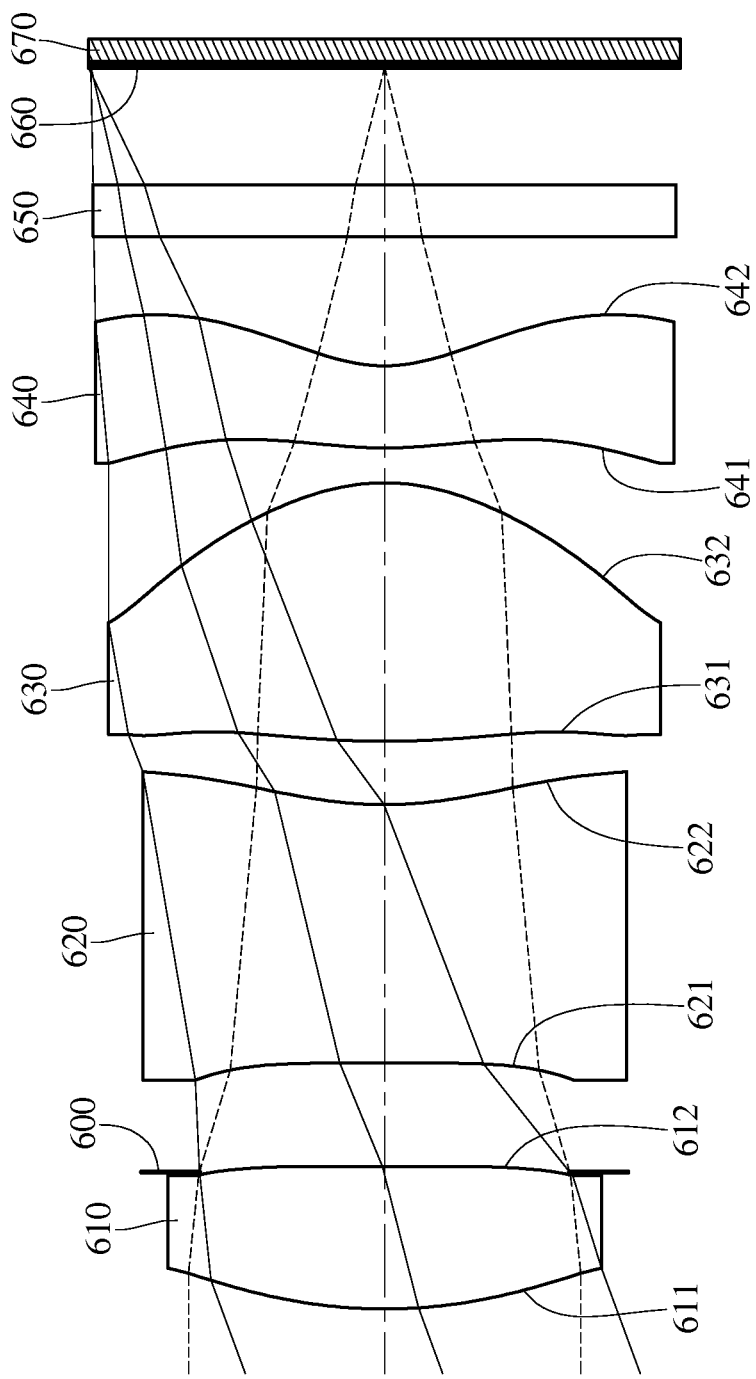
FIG. 11 is a schematic view of an image capturing unit according to the 6th embodiment of the present disclosure.
Figure 12:
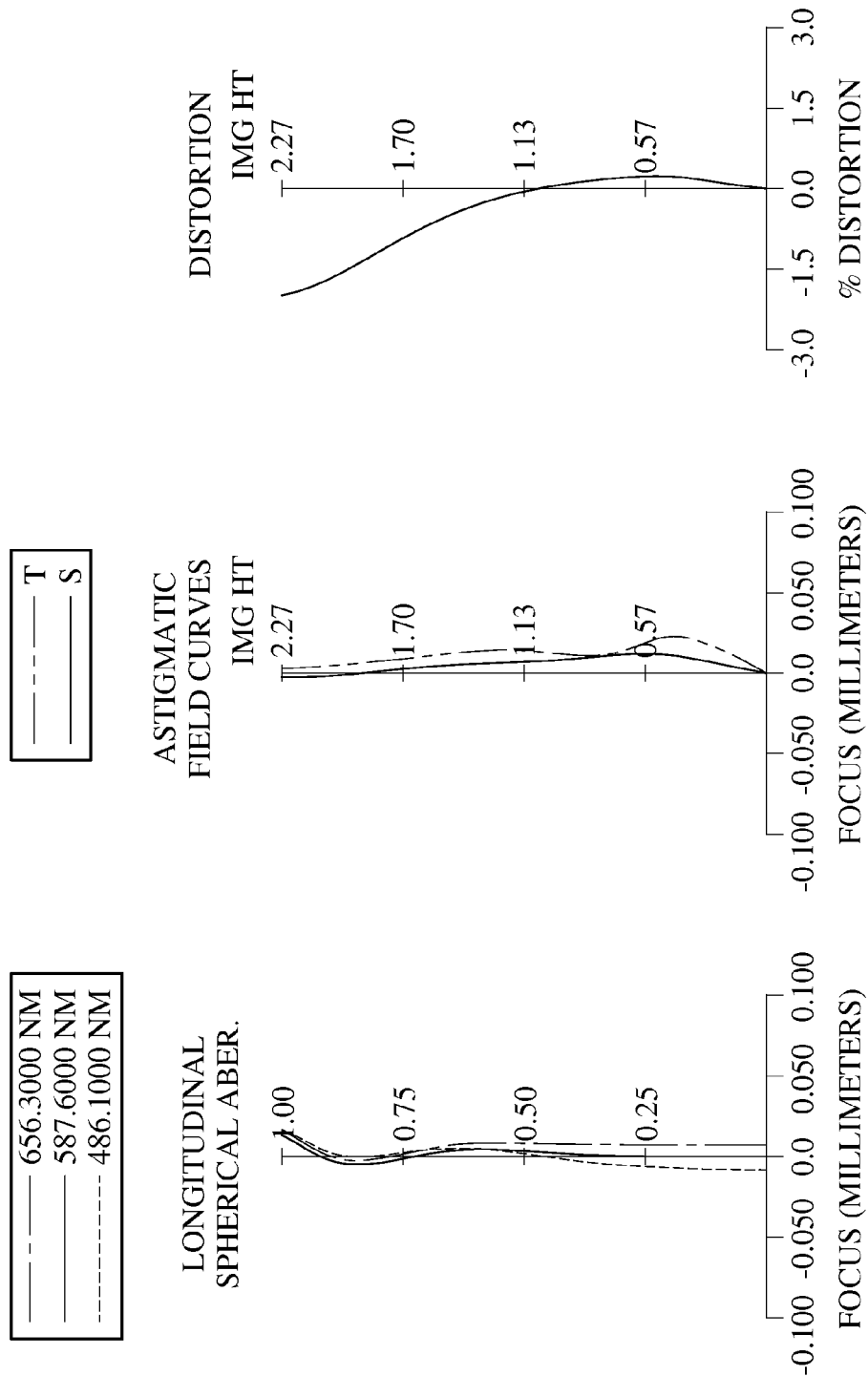
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical lens system (its reference numeral is omitted) of the present disclosure and an image sensor 670. The optical lens system includes, in order from an object side to an image side, a first lens element 610, an aperture stop 600, a second lens element 620, a third lens element 630, a fourth lens element 640, an IR-cut filter 650 and an image surface 660, wherein the optical lens system has a total of four non-cemented lens elements (610-640) with refractive power. There is an air gap in a paraxial region between any two of the first lens element 610, the second lens element 620, the third lens element 630 and the fourth lens element 640 that are adjacent to each other.

The first lens element 610 with positive refractive power has an object-side surface 611 being convex in a paraxial region thereof and an image-side surface 612 being concave in a paraxial region thereof. The first lens element 610 is made of plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of plastic material, and has the object-side surface 631 and the image-side surface 632 being both aspheric.

The fourth lens element 640 with negative refractive power has an object-side surface 641 being convex in a paraxial region thereof and an image-side surface 642 being concave in a paraxial region thereof. The fourth lens element 640 is made of plastic material, and has the object-side surface 641 and the image-side surface 642 being both aspheric. The image-side surface 642 of the fourth lens element 640 has at least one convex shape in an off-axis region thereof.

The IR-cut filter 650 is made of glass and located between the fourth lens element 640 and the image surface 660, and will not affect the focal length of the optical lens system. The image sensor 670 is disposed on or near the image surface 660 of the optical lens system.

The detailed optical data of the 6th embodiment are shown in Table 11 and the aspheric surface data are shown in Table 12 below.

TABLE 11

6th Embodiment
f = 6.30 mm, Fno = 2.08, HFOV = 20.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 3.945 (ASP) | 1.103 | Plastic | 1.544 | 55.9 | 7.52 |
| 2 | | 98.676 (ASP) | −0.042 | | | | |
| 3 | Ape. Stop | Plano | 0.840 | | | | |
| 4 | Lens 2 | 51.239 (ASP) | 2.000 | Plastic | 1.639 | 23.5 | −5.13 |
| 5 | | 3.033 (ASP) | 0.490 | | | | |
| 6 | Lens 3 | 7.158 (ASP) | 2.000 | Plastic | 1.544 | 55.9 | 2.61 |
| 7 | | −1.599 (ASP) | 0.270 | | | | |
| 8 | Lens 4 | 3.445 (ASP) | 0.635 | Plastic | 1.535 | 55.7 | −3.66 |
| 9 | | 1.167 (ASP) | 1.000 | | | | |
| 10 | IR-cut filter | Plano | 0.400 | Glass | 1.517 | 64.2 | — |
| 11 | | Plano | 0.901 | | | | |
| 12 | Image | Plano | — | | | | |

Note:
Reference wavelength is 587.6 nm (d-line).

TABLE 12

Aspheric Coefficients

| Surface # | 1 | 2 | 4 | 5 |
|---|---|---|---|---|
| k = | −1.6346E+00 | 9.9000E+01 | 0.0000E+00 | −3.2018E+00 |
| A4 = | 1.4715E−03 | −1.7474E−02 | −3.5253E−02 | −2.4122E−02 |
| A6 = | −1.7501E−03 | 9.5181E−04 | 2.3705E−03 | −1.0923E−03 |
| A8 = | 7.7926E−04 | −5.6877E−04 | −2.5739E−03 | 1.5981E−03 |
| A10 = | −2.9429E−04 | −3.7096E−05 | 2.4743E−03 | −4.4353E−04 |
| A12 = | — | — | −1.2041E−03 | 4.6611E−05 |
| A14 = | — | — | 2.1731E−04 | 2.5995E−06 |

| Surface # | 6 | 7 | 8 | 9 |
|---|---|---|---|---|
| k = | 1.2598E+00 | −1.9862E+00 | −3.4650E+01 | −4.3049E+00 |
| A4 = | −5.5214E−03 | 2.2127E−02 | −3.4418E−02 | −4.8647E−02 |
| A6 = | −9.8415E−03 | −1.7334E−02 | −4.8108E−04 | 9.6020E−03 |
| A8 = | 3.1703E−03 | 5.4438E−03 | 1.9909E−03 | −1.5029E−03 |
| A10 = | −1.2130E−03 | −1.0907E−03 | −3.3684E−04 | 1.5282E−04 |
| A12 = | 3.5753E−04 | 1.2282E−04 | 1.8141E−05 | −7.0055E−06 |
| A14 = | −3.3714E−05 | −3.3257E−06 | — | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.30 | EPD/(T12 + T23 + T34) | 1.94 |
| Fno | 2.08 | ImgH/f | 0.36 |
| HFOV [deg.] | 20.2 | (R1 + R2)/(R1 − R2) | −1.08 |
| CT2/CT4 | 3.15 | f/R8 | 5.40 |
| CT2/(T12 + T23 + T34) | 1.28 | f2/f1 | −0.68 |
| CT2/BFL | 0.92 | |f/f3| + |f/f4| | 14.14 |
| T12/(T23 + T34) | 1.05 | tan(2 * HFOV) | 0.85 |

7th Embodiment

Figure 13:
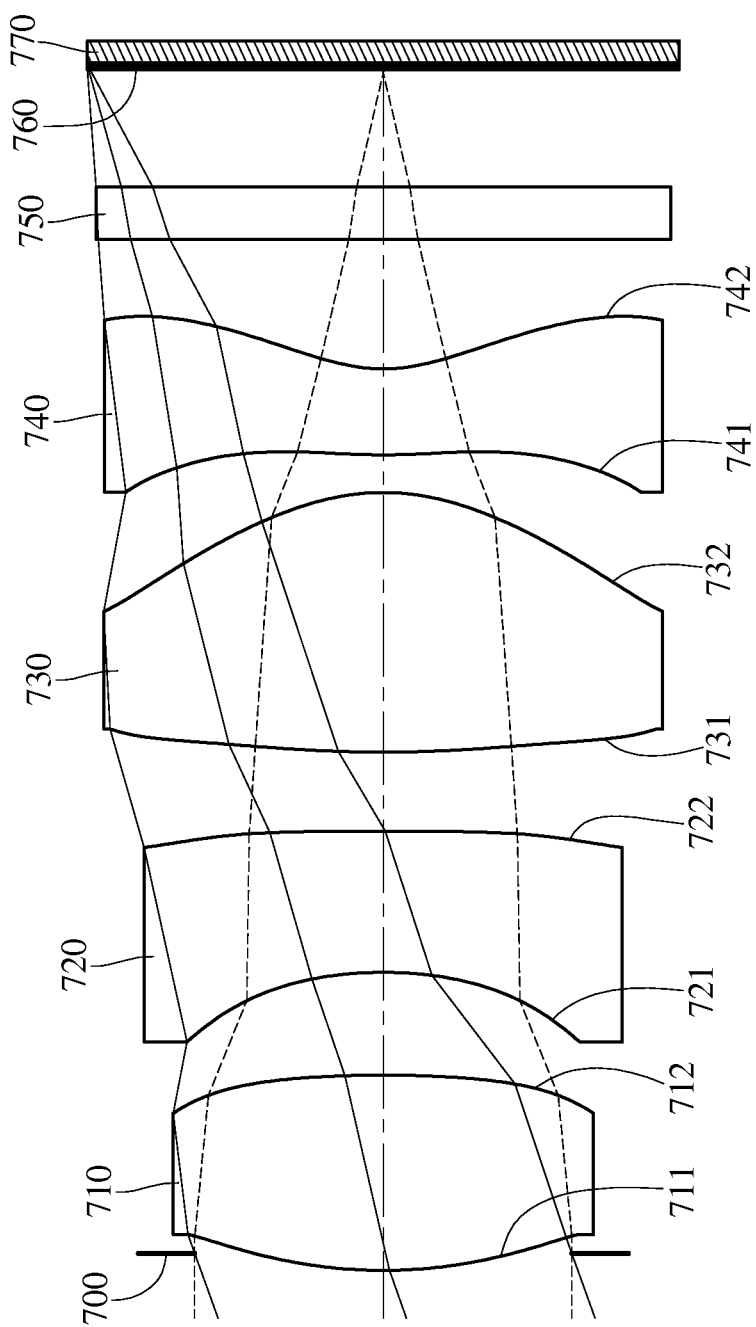
FIG. 13 is a schematic view of an image capturing unit according to the 7th embodiment of the present disclosure.
Figure 14:
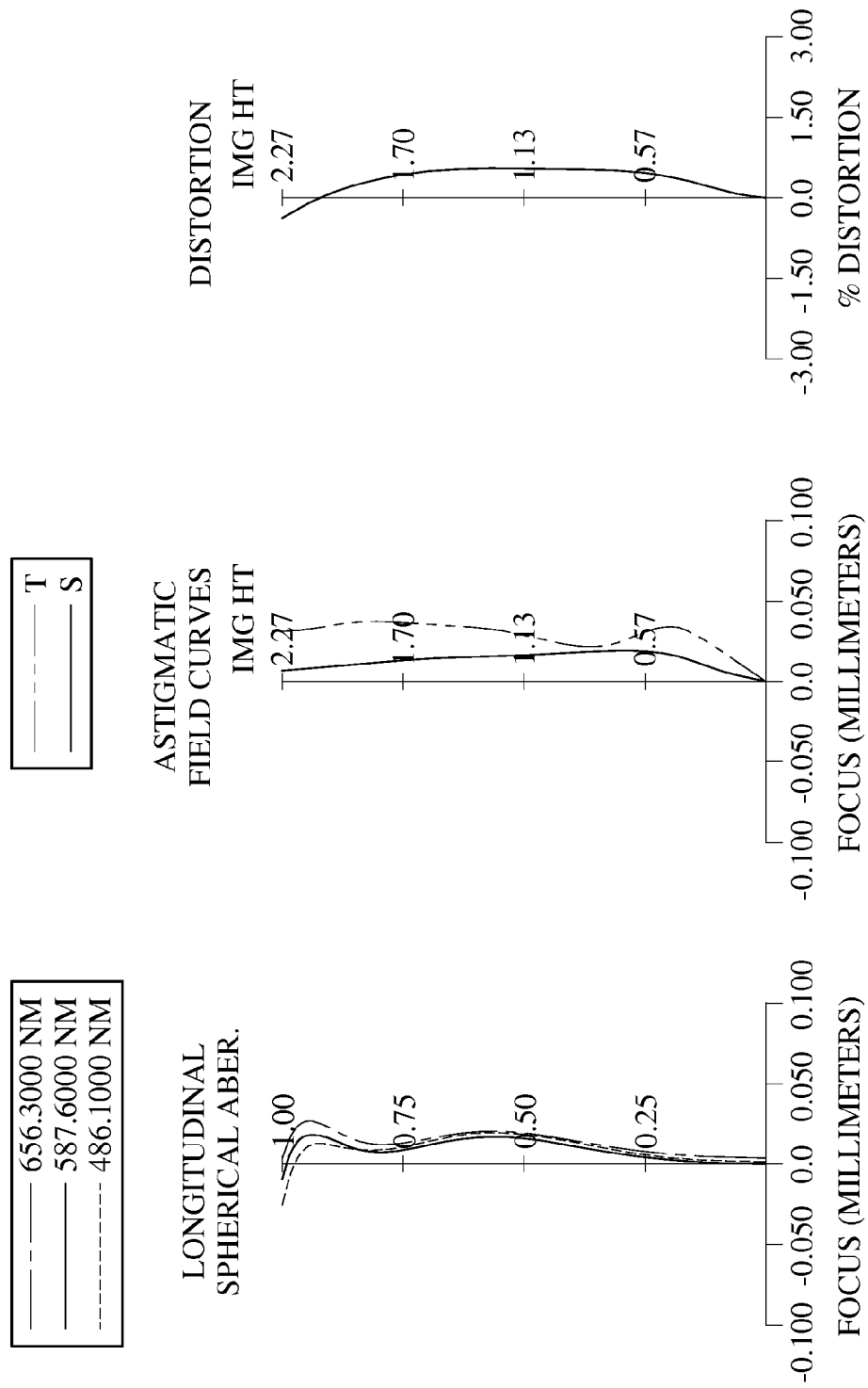
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical lens system (its reference numeral is omitted) of the present disclosure and an image sensor 770. The optical lens system includes, in order from an object side to an image side, an aperture stop 700, a first lens element 710, a second lens element 720, a third lens element 730, a fourth lens element 740, an IR-cut filter 750 and an image surface 760, wherein the optical lens system has a total of four non-cemented lens elements (710-740) with refractive power. There is an air gap in a paraxial region between any two of the first lens element 710, the second lens element 720, the third lens element 730 and the fourth lens element 740 that are adjacent to each other.

The first lens element 710 with positive refractive power has an object-side surface 711 being convex in a paraxial region thereof and an image-side surface 712 being convex in a paraxial region thereof. The first lens element 710 is made of plastic material, and has the object-side surface 711 and the image-side surface 712 being both aspheric.

The second lens element 720 with negative refractive power has an object-side surface 721 being concave in a paraxial region thereof and an image-side surface 722 being convex in a paraxial region thereof. The second lens element 720 is made of plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of plastic material, and has the object-side surface 731 and the image-side surface 732 being both aspheric.

The fourth lens element 740 with negative refractive power has an object-side surface 741 being convex in a paraxial region thereof and an image-side surface 742 being concave in a paraxial region thereof. The fourth lens element 740 is made of plastic material, and has the object-side surface 741 and the image-side surface 742 being both aspheric. The image-side surface 742 of the fourth lens element 740 has at least one convex shape in an off-axis region thereof.

The IR-cut filter 750 is made of glass and located between the fourth lens element 740 and the image surface 760, and will not affect the focal length of the optical lens system. The image sensor 770 is disposed on or near the image surface 760 of the optical lens system.

The detailed optical data of the 7th embodiment are shown in Table 13 and the aspheric surface data are shown in Table 14 below.

TABLE 13

7th Embodiment
f = 6.38 mm, Fno = 2.20, HFOV = 19.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.131 | | | | |
| 2 | Lens 1 | 3.755 (ASP) | 1.504 | Plastic | 1.544 | 55.9 | 5.15 |
| 3 | | −9.509 (ASP) | 0.792 | | | | |
| 4 | Lens 2 | −2.981 (ASP) | 1.087 | Plastic | 1.639 | 23.5 | −4.86 |
| 5 | | −86.598 (ASP) | 0.609 | | | | |
| 6 | Lens 3 | 9.924 (ASP) | 2.000 | Plastic | 1.544 | 55.9 | 2.91 |
| 7 | | −1.752 (ASP) | 0.290 | | | | |
| 8 | Lens 4 | 5.048 (ASP) | 0.662 | Plastic | 1.535 | 55.7 | −3.32 |
| 9 | | 1.255 (ASP) | 1.000 | | | | |
| 10 | IR-cut filter | Plano | 0.400 | Glass | 1.517 | 64.2 | — |

TABLE 13-continued

7th Embodiment
f = 6.38 mm, Fno = 2.20, HFOV = 19.6 deg.

| Surface # | | Curvature Radius | Thickness | Material | Index | Abbe # | Focal Length |
|---|---|---|---|---|---|---|---|
| 11 | | Plano | 0.902 | | | | |
| 12 | Image | Plano | — | | | | |

Note:
Reference wavelength is 587.6 nm (d-line).

TABLE 14

Aspheric Coefficients

| Surface # | 2 | 3 | 4 | 5 |
|---|---|---|---|---|
| k = | −1.1780E+00 | −6.2896E+01 | 0.0000E+00 | −9.9000E+01 |
| A4 = | 2.3566E−03 | −1.8360E−02 | −1.6370E−02 | −1.0029E−02 |
| A6 = | −3.0326E−03 | −1.4075E−03 | −3.6153E−03 | −3.6147E−03 |
| A8 = | 1.4407E−03 | −1.2673E−03 | −2.9844E−03 | 1.4576E−03 |
| A10 = | −6.0138E−04 | 1.5100E−04 | 1.3225E−03 | −2.5421E−04 |
| A12 = | — | — | 1.3562E−04 | 9.2390E−05 |
| A14 = | — | — | −5.2672E−05 | −1.3321E−05 |

| Surface # | 6 | 7 | 8 | 9 |
|---|---|---|---|---|
| k = | 1.4435E+01 | −2.2302E+00 | −8.9982E+01 | −4.6463E+00 |
| A4 = | −4.0125E−03 | 1.0023E−02 | −6.4756E−02 | −4.7512E−02 |
| A6 = | −4.4323E−03 | −4.9053E−03 | 2.1036E−02 | 1.4006E−02 |
| A8 = | 1.4871E−03 | 6.7198E−04 | −5.2259E−03 | −3.1171E−03 |
| A10 = | −2.4325E−04 | 1.2691E−04 | 8.0427E−04 | 3.7194E−04 |
| A12 = | 4.5062E−05 | −4.2941E−05 | −6.3336E−05 | −1.9439E−05 |
| A14 = | −4.2603E−06 | 3.9397E−06 | — | — |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.38 | EPD/(T12 + T23 + T34) | 1.71 |
| Fno | 2.20 | ImgH/f | 0.36 |
| HFOV [deg.] | 19.6 | (R1 + R2)/(R1 − R2) | −0.43 |
| CT2/CT4 | 1.64 | f/R8 | 5.09 |
| CT2/(T12 + T23 + T34) | 0.64 | f2/f1 | −0.94 |
| CT2/BFL | 0.50 | |f/f3| + |f/f4| | 4.11 |
| T12/(T23 + T34) | 0.88 | tan(2 * HFOV) | 0.82 |

8th Embodiment

Figure 15:
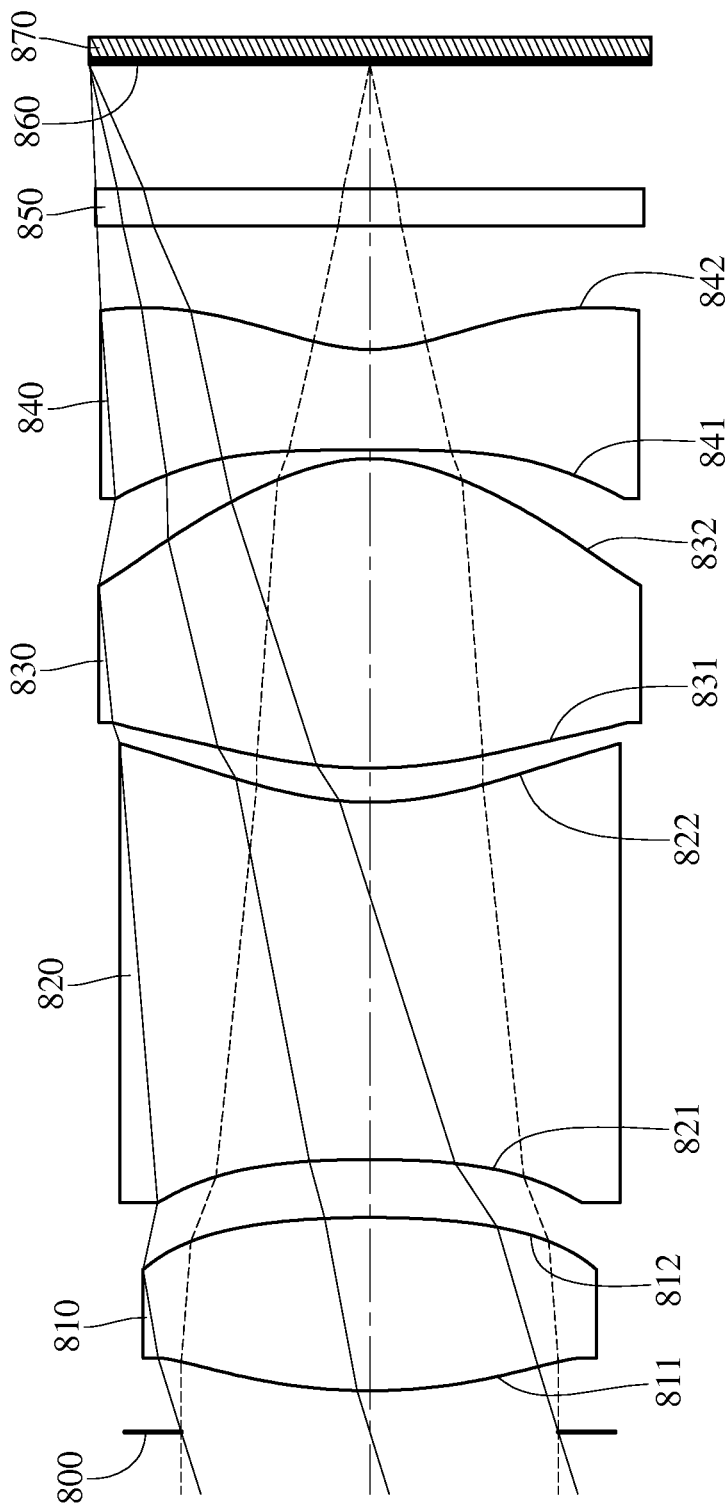
FIG. 15 is a schematic view of an image capturing unit according to the 8th embodiment of the present disclosure.
Figure 16:
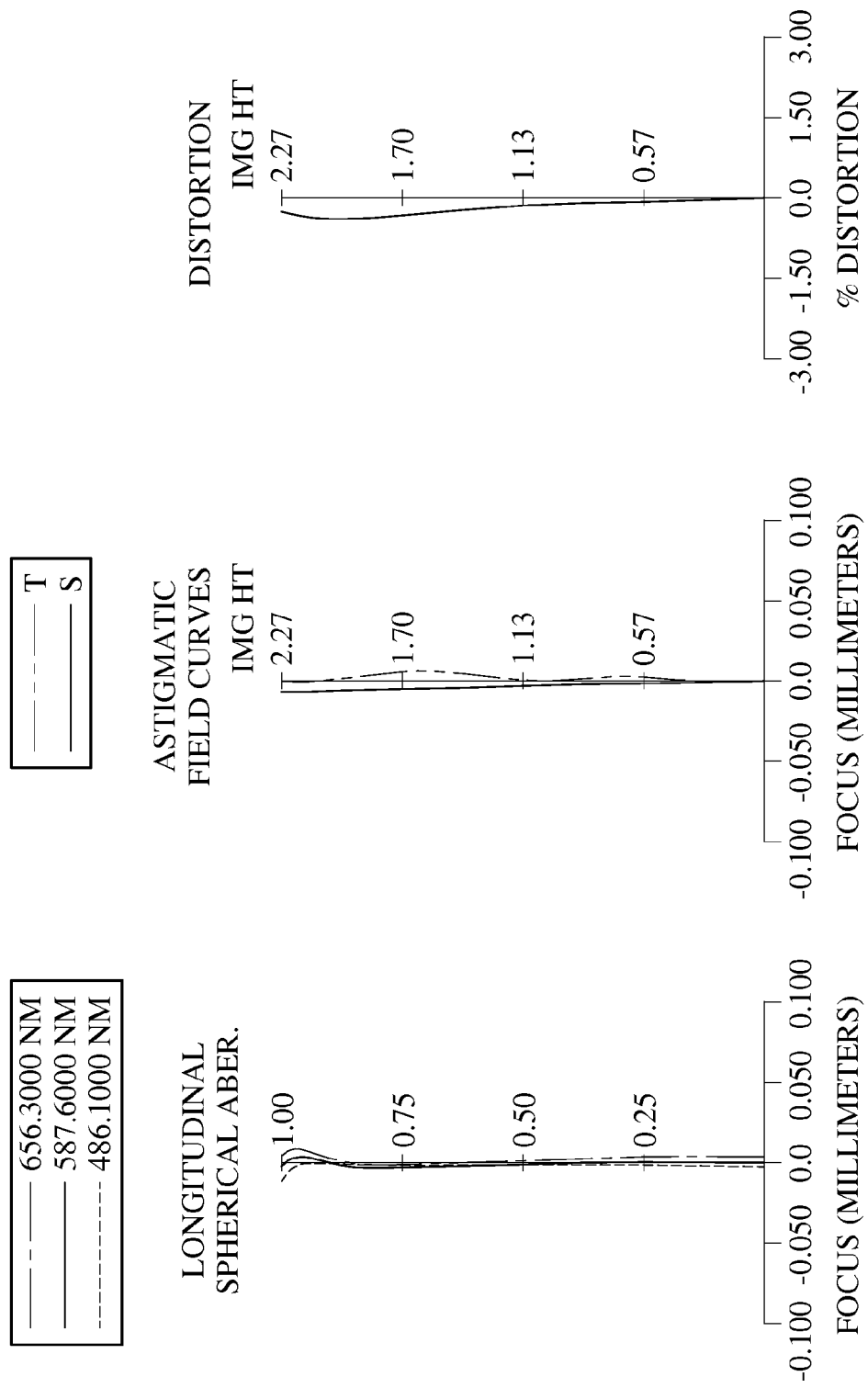
FIG. 16 shows spherical aberration curves, astigmatic field curves and a distortion curve of the image capturing unit according to the 8th embodiment.
Figure 18:
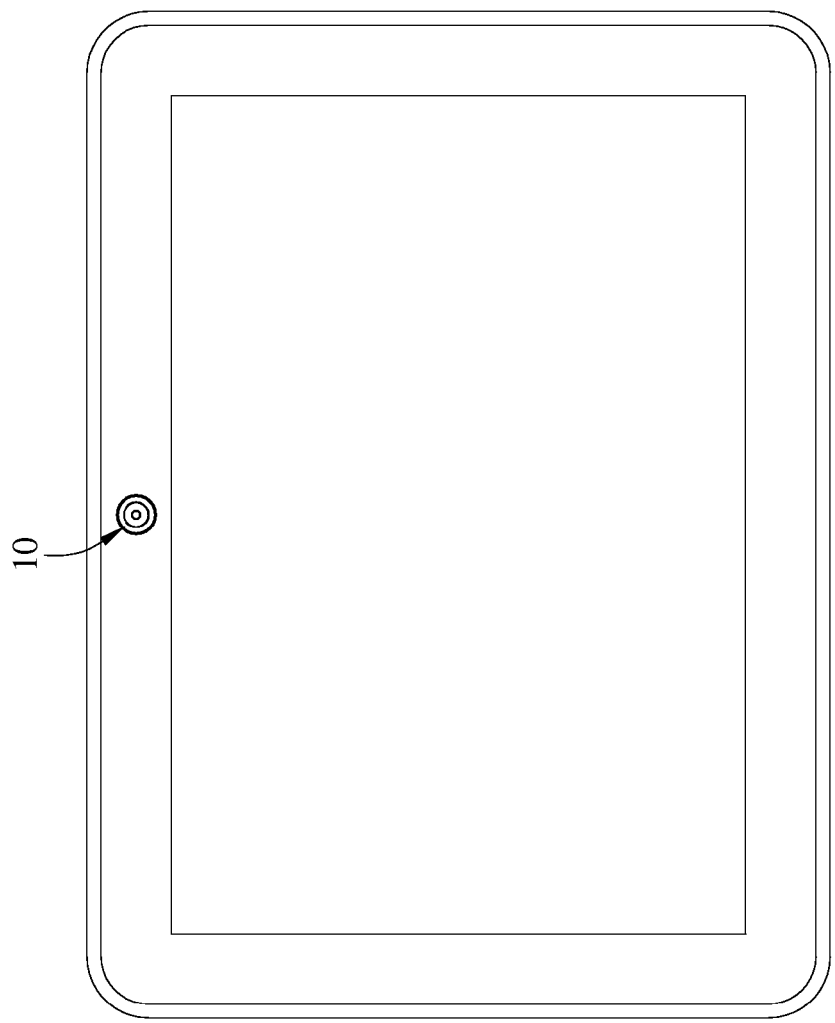
FIG. 18 shows an electronic device according to another embodiment.
Figure 17:
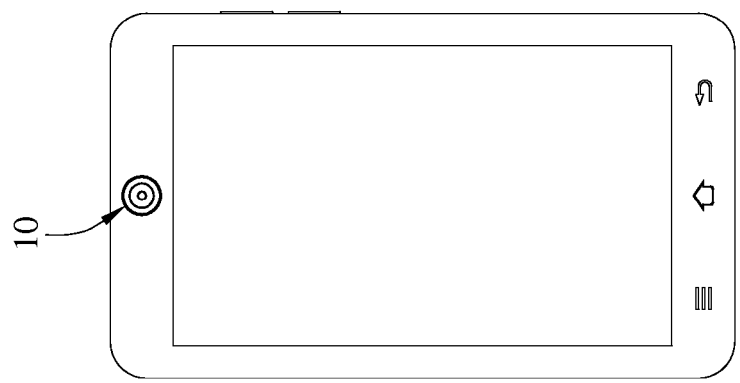
FIG. 17 shows an electronic device according to one embodiment.
Figure 19:
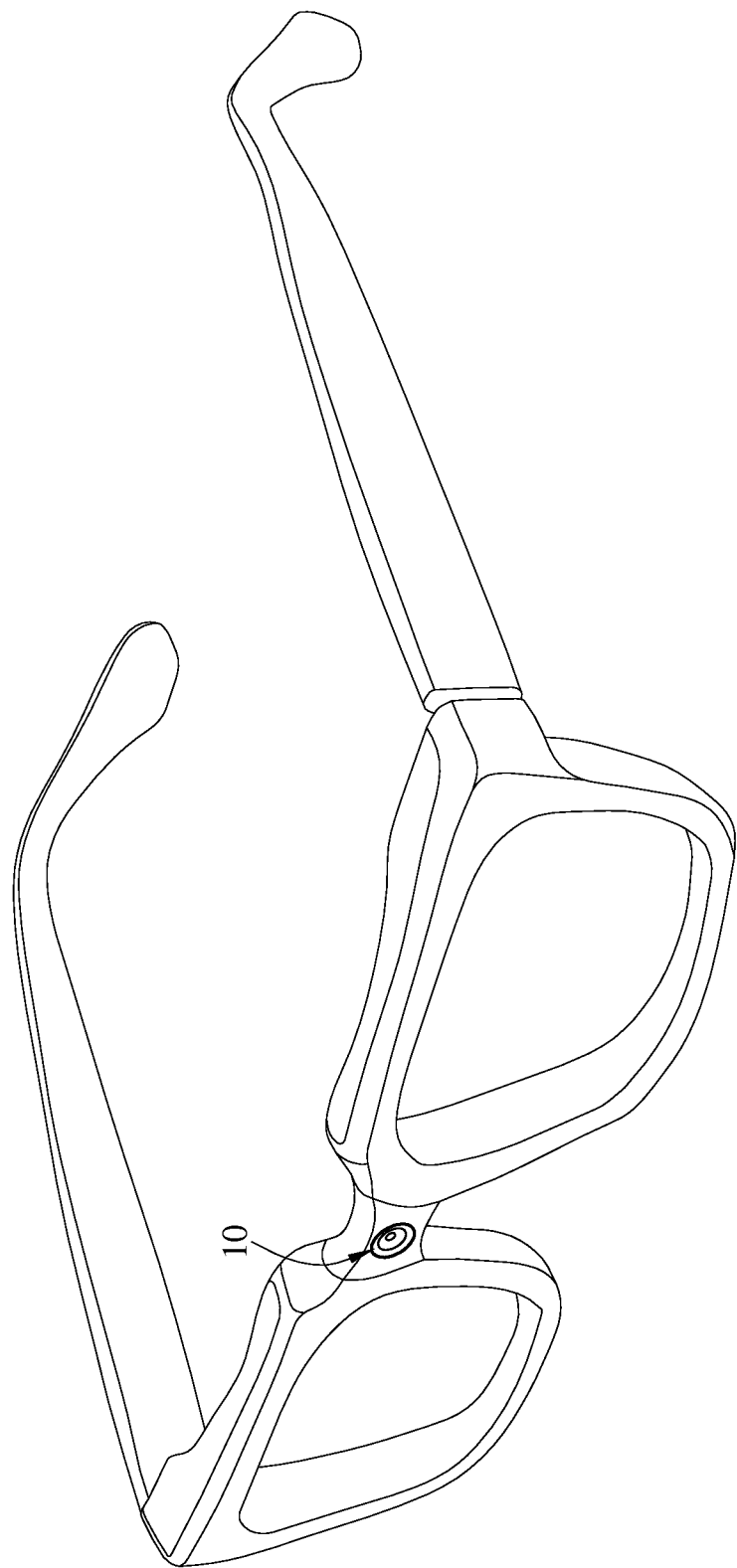
FIG. 19 shows an electronic device according to still another embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical lens system (its reference numeral is omitted) of the present disclosure and an image sensor 870. The optical lens system includes, in order from an object side to an image side, an aperture stop 800, a first lens element 810, a second lens element 820, a third lens element 830, a fourth lens element 840, an IR-cut filter 850 and an image surface 860, wherein the optical lens system has a total of four non-cemented lens elements (810-840) with refractive power. There is an air gap in a paraxial region between any two of the first lens element 810, the second lens element 820, the third lens element 830 and the fourth lens element 840 that are adjacent to each other.

The first lens element 810 with positive refractive power has an object-side surface 811 being convex in a paraxial region thereof and an image-side surface 812 being convex in a paraxial region thereof. The first lens element 810 is made of plastic material, and has the object-side surface 811 and the image-side surface 812 being both aspheric.

The second lens element 820 with negative refractive power has an object-side surface 821 being concave in a paraxial region thereof and an image-side surface 822 being concave in a paraxial region thereof. The second lens element 820 is made of plastic material, and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of plastic material, and has the object-side surface 831 and the image-side surface 832 being both aspheric.

The fourth lens element 840 with negative refractive power has an object-side surface 841 being concave in a paraxial region thereof and an image-side surface 842 being concave in a paraxial region thereof. The fourth lens element 840 is made of plastic material, and has the object-side surface 841 and the image-side surface 842 being both aspheric. The image-side surface 842 of the fourth lens element 840 has at least one convex shape in an off-axis region thereof.

The IR-cut filter 850 is made of glass and located between the fourth lens element 840 and the image surface 860, and will not affect the focal length of the optical lens system. The image sensor 870 is disposed on or near the image surface 860 of the optical lens system.

The detailed optical data of the 8th embodiment are shown in Table 15 and the aspheric surface data are shown in Table 16 below.

TABLE 15

8th Embodiment
f = 7.30 mm, Fno = 2.40, HFOV = 17.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | 0.334 | | | | |
| 2 | Lens 1 | 4.563 (ASP) | 1.400 | Plastic | 1.544 | 55.9 | 5.63 |
| 3 | | −8.326 (ASP) | 0.468 | | | | |
| 4 | Lens 2 | −8.952 (ASP) | 2.887 | Plastic | 1.583 | 30.2 | −3.20 |
| 5 | | 2.642 (ASP) | 0.276 | | | | |
| 6 | Lens 3 | 3.849 (ASP) | 2.500 | Plastic | 1.544 | 55.9 | 2.22 |
| 7 | | −1.359 (ASP) | 0.070 | | | | |
| 8 | Lens 4 | −41.972 (ASP) | 0.812 | Plastic | 1.535 | 55.7 | −2.45 |
| 9 | | 1.362 (ASP) | 1.000 | | | | |
| 10 | IR-cut filter | Plano | 0.300 | Glass | 1.517 | 64.2 | — |
| 11 | | Plano | 1.001 | | | | |
| 12 | Image | Plano | — | | | | |

Note:
Reference wavelength is 587.6 nm (d-line).

TABLE 16

Aspheric Coefficients

| Surface # | 2 | 3 | 4 | 5 |
|---|---|---|---|---|
| k = | −5.1165E−01 | 1.1038E+01 | 0.0000E+00 | −2.4420E+00 |
| A4 = | −7.6890E−04 | −1.0119E−02 | −2.2753E−02 | −1.4741E−02 |
| A6 = | −4.0815E−04 | −2.0683E−04 | 1.5305E−03 | −7.8170E−04 |
| A8 = | −5.4608E−04 | −1.1568E−04 | −6.1073E−04 | 1.2752E−03 |
| A10 = | 2.2010E−04 | −2.0757E−04 | 9.9583E−05 | −3.7267E−04 |
| A12 = | −8.1965E−05 | 3.2044E−05 | −8.6097E−05 | 4.9137E−05 |
| A14 = | — | — | 2.7721E−05 | −2.0988E−06 |

| Surface # | 6 | 7 | 8 | 9 |
|---|---|---|---|---|
| k = | −1.0000E+00 | −4.5448E+00 | 9.9000E+01 | −6.3815E+00 |
| A4 = | −8.2100E−03 | −1.9688E−02 | −2.3209E−02 | −3.4322E−02 |
| A6 = | −3.6385E−03 | 3.4531E−03 | −5.2080E−03 | 5.4810E−03 |
| A8 = | 8.1920E−04 | −6.3921E−04 | 2.9124E−03 | −5.8763E−04 |
| A10 = | 4.6765E−05 | 9.0889E−05 | −4.1361E−04 | 4.2409E−05 |
| A12 = | −2.3011E−05 | 6.9484E−06 | 1.6860E−05 | −1.9443E−06 |
| A14 = | 1.6689E−06 | −1.6060E−06 | — | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

8th Embodiment

| | | | |
|---|---|---|---|
| f [mm] | 7.30 | EPD/(T12 + T23 + T34) | 3.74 |
| Fno | 2.40 | ImgH/f | 0.31 |
| HFOV [deg.] | 17.3 | (R1 + R2)/(R1 − R2) | −0.29 |
| CT2/CT4 | 3.56 | f/R8 | 5.36 |
| CT2/(T12 + T23 + T34) | 3.55 | f2/f1 | −0.57 |
| CT2/BFL | 1.31 | |f/f3| + |f/f4| | 6.27 |
| T12/(T23 + T34) | 1.35 | tan(2 * HFOV) | 0.69 |

The foregoing image capturing unit is able to be installed in, but not limited to, an electronic device, including smart phones, tablet personal computers, wearable apparatus and driving assist devices. According to the present disclosure, the optical lens system has a total of four lens elements with refractive power. The second lens element with greater thickness is favorable for strengthening the negative refractive power of the second lens element so as to provide the optical lens system with enhanced telephoto performance. The optical lens system with enhanced telephoto performance is favorable for reduce the chief ray angle of the optical lens system so as to keep the relative illumination of the optical lens system sufficient. Furthermore, the thickness of the second lens element is favorable for preventing the second lens element from unfavorable molding problems so as to prevent the structure of the optical lens system from becoming overly fragile, thereby improving the stability of the optical lens system.

The foregoing description, for the purpose of explanation, has been described with reference to specific embodiments. It is to be noted that TABLES 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens system comprising, in order from an object side to an image side:
    a first lens element with positive refractive power having an object-side surface being convex in a paraxial region thereof;
    a second lens element having negative refractive power;
    a third lens element with positive refractive power having an image-side surface being convex in a paraxial region thereof, wherein both of an object-side surface and the image-side surface of the third lens element are aspheric; and
    a fourth lens element with negative refractive power having an image-side surface being concave in a paraxial region thereof, wherein the image-side surface of the fourth lens element has at least one convex shape in an off-axis region thereof, and both of an object-side surface and the image-side surface of the fourth lens element are aspheric;

wherein the optical lens system has a total of four lens elements, an air gap in a paraxial region is between any two of the first lens element, the second lens element, the third lens element and the fourth lens element that are adjacent to each other;

wherein a central thickness of the second lens element is CT2, a central thickness of the fourth lens element is CT4, an axial distance between the first lens element and the second lens element is T12, an axial distance between the second lens element and the third lens element is T23, an axial distance between the third lens element and the fourth lens element is T34, and the following conditions are satisfied:

$1.45 < CT2/CT4;$ $0.80 < CT2/(T12+T23+T34) < 3.0;$ and $0.85 < T12/(T23+T34).$

2. The optical lens system of claim 1, wherein the central thickness of the second lens element is CT2, the central thickness of the fourth lens element is CT4, and the following condition is satisfied:

$1.80 < CT2/CT4 < 5.0.$

3. The optical lens system of claim 1, wherein the object-side surface of the third lens element is convex in a paraxial region thereof.

4. The optical lens system of claim 1, wherein the first lens element is made of glass material, and both of the object-side surface and an image-side surface of the first lens element are spherical.

5. The optical lens system of claim 1, wherein the central thickness of the second lens element is CT2, the axial distance between the first lens element and the second lens element is T12, the axial distance between the second lens element and the third lens element is T23, the axial distance between the third lens element and the fourth lens element is T34, and the following condition is satisfied:

$1.0 < CT2/(T12+T23+T34) < 3.0.$

6. The optical lens system of claim 1, wherein the axial distance between the first lens element and the second lens element is T12, the axial distance between the second lens element and the third lens element is T23, the axial distance between the third lens element and the fourth lens element is T34, and the following condition is satisfied:

$1.20 < T12/(T23+T34).$

7. The optical lens system of claim 1, wherein a focal length of the optical lens system is f, a focal length of the third lens element is f3, a focal length of the fourth lens element is f4, and the following condition is satisfied:

$4.5 < |f/f3|+|f/f4| < 7.0.$

8. The optical lens system of claim 1, wherein a maximum image height of the optical lens system is ImgH, a focal length of the optical lens system is f, and the following condition is satisfied:

$0.20 < ImgH/f < 0.50.$

9. The optical lens system of claim 1, wherein the object-side surface of the fourth lens element is convex in a paraxial region thereof.

10. The optical lens system of claim 1, wherein a focal length of the first lens element is f1, a focal length of the second lens element is f2, and the following condition is satisfied:

$-0.90 < f2/f1 < -0.30.$

11. The optical lens system of claim 1, wherein a focal length of the optical lens system is f, a curvature radius of the image-side surface of the fourth lens element is R8, and the following condition is satisfied:

$4.7 < f/R8.$

12. The optical lens system of claim 1, wherein the central thickness of the second lens element is CT2, an axial distance between the image-side surface of the fourth lens element and an image surface is BFL, and the following condition is satisfied:

$0.65 < CT2/BFL < 1.5.$

13. The optical lens system of claim 1, wherein a curvature radius of the object-side surface of the first lens element is R1, a curvature radius of an image-side surface of the first lens element is R2, and the following condition is satisfied:

$-1.15 < (R1+R2)/(R1-R2) < 0.50.$

14. An image capturing unit, comprising:
the optical lens system of claim 1; and
an image sensor, wherein the image sensor is disposed on the image side of the optical lens system.

15. An electronic device comprising:
the image capturing unit of claim 14.

16. An optical lens system comprising, in order from an object side to an image side:
a first lens element with positive refractive power having an object-side surface being convex in a paraxial region thereof;
a second lens element having negative refractive power;
a third lens element with positive refractive power having an image-side surface being convex in a paraxial region thereof, wherein both of an object-side surface and the image-side surface of the third lens element are aspheric; and
a fourth lens element with negative refractive power having an image-side surface being concave in a paraxial region thereof, wherein the image-side surface of the fourth lens element has at least one convex shape in an off-axis region thereof, and both of an object-side surface and the image-side surface of the fourth lens element are aspheric;

wherein the optical lens system has a total of four lens elements, an air gap in a paraxial region is between any two of the first lens element, the second lens element, the third lens element and the fourth lens element that are adjacent to each other;

wherein a central thickness of the second lens element is CT2, a central thickness of the fourth lens element is CT4, an axial distance between the first lens element and the second lens element is T12, an axial distance between the second lens element and the third lens element is T23, an axial distance between the third lens element and the fourth lens element is T34, and the following conditions are satisfied:

$1.33 < CT2/CT4;$ $0.80 < CT2/(T12+T23+T34) < 3.0;$ and $0.95 < T12/(T23+T34).$

17. The optical lens system of claim 16, wherein the central thickness of the second lens element is CT2, the central thickness of the fourth lens element is CT4, and the following condition is satisfied:

$1.80 < CT2/CT4 < 5.0.$

18. The optical lens system of claim 16, wherein a focal length of the first lens element is f1, a focal length of the second lens element is f2, and the following condition is satisfied:

$-0.90 < f2/f1 < -0.30.$

19. The optical lens system of claim 16, wherein an entrance pupil diameter of the optical lens system is EPD, the axial distance between the first lens element and the second lens element is T12, the axial distance between the second lens element and the third lens element is T23, the axial distance between the third lens element and the fourth lens element is T34, and the following condition is satisfied:

$1.8 < EPD/(T12+T23+T34) < 3.0.$

20. The optical lens system of claim 16, wherein a focal length of the optical lens system is f, a curvature radius of the image-side surface of the fourth lens element is R8, and the following condition is satisfied:

$4.7 < f/R8.$

21. The optical lens system of claim 16, wherein the central thickness of the second lens element is CT2, an axial distance between the image-side surface of the fourth lens element and an image surface is BFL, and the following condition is satisfied:

$0.65 < CT2/BFL < 1.5.$

22. The optical lens system of claim 16, wherein half of a maximal field of view of the optical lens system is HFOV, and the following condition is satisfied:

$0.40 < \tan(2*HFOV) < 1.20.$

23. An image capturing unit, comprising:
the optical lens system of claim 16; and
an image sensor, wherein the image sensor is disposed on the image side of the optical lens system.

24. An electronic device comprising:
the image capturing unit of claim 23.

* * * * *